(12) United States Patent
Ohara et al.

(10) Patent No.: US 12,301,671 B2
(45) Date of Patent: *May 13, 2025

(54) INFORMATION PROCESSING SYSTEM, INFORMATION PROCESSING METHOD AND PROGRAM

(71) Applicant: Nippon Telegraph and Telephone Corporation, Tokyo (JP)

(72) Inventors: Takuya Ohara, Musashino (JP); Takuya Oda, Musashino (JP); Fumikazu Inuzuka, Musashino (JP); Takafumi Tanaka, Musashino (JP); Masayuki Shimoda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,370

(22) Filed: Jan. 16, 2024

(65) Prior Publication Data
US 2024/0155035 A1  May 9, 2024

Related U.S. Application Data

(63) Continuation of application No. 18/025,524, filed as application No. PCT/JP2020/034724 on Sep. 14, 2020, now Pat. No. 11,917,019.

(51) Int. Cl.
*H04L 67/141* (2022.01)
*H04L 41/084* (2022.01)

(52) U.S. Cl.
CPC ........ *H04L 67/141* (2013.01); *H04L 41/0846* (2013.01)

(58) Field of Classification Search
CPC ... H04L 67/01; H04L 65/1069; H04L 67/146; H04L 67/14; H04L 63/08; H04L 41/0846;
(Continued)

(56) References Cited

U.S. PATENT DOCUMENTS 6,678,524 B1  1/2004  Hansson et al.
6,884,171 B2  4/2005  Eck et al.
(Continued)

FOREIGN PATENT DOCUMENTS

EP  3041311  7/2016
JP  A-10-117215  5/1998
(Continued)

OTHER PUBLICATIONS

ATEN International Co., Ltd., "KE6920 datasheet," ver. 01, Jun. 17, 2020, retrieved from URL <https://assets.aten.com/product/spec_sheet/JP/ke6920-6922_ver01j.pdf>, ATEN Product Information KE6920, pp. 1-5 (No Translation).
(Continued)

*Primary Examiner* — Mohamed Ibrahim
(74) *Attorney, Agent, or Firm* — Fish & Richardson P.C.

(57) ABSTRACT

One aspect of the present invention is an information processing system that includes a computing machine installed in a computing machine base, and a first transmitting/receiving apparatus connected to the computing machine, a second transmitting/receiving apparatus installed in a user base that is used by a user, and a device connected to the second transmitting/receiving apparatus, and a control apparatus configured to control connection between the first transmitting/receiving apparatus and the second transmitting/receiving apparatus. In the information processing system, the control apparatus is configured to change the connection between the first transmitting/receiving apparatus and the second transmitting/receiving apparatus, and copy the state of the pre-change computing machine from the pre-change computing machine into the post-change computing machine.

6 Claims, 18 Drawing Sheets

(58) Field of Classification Search
CPC ......... H04L 67/12; H04L 67/10; H04L 67/02; H04L 67/141

See application file for complete search history.

(56) References Cited

U.S. PATENT DOCUMENTS

| | | | |
|---|---|---|---|
| 6,914,972 B1 | 7/2005 | Baumeister et al. | |
| 7,445,551 B1 | 11/2008 | Okada et al. | |
| 7,471,673 B2 | 12/2008 | Arai et al. | |
| 7,519,049 B2 | 4/2009 | Masuda | |
| 7,822,065 B2* | 10/2010 | Lu | H04L 69/326 |
| | | | 455/418 |
| 8,157,654 B2 | 4/2012 | Link | |
| 8,312,660 B1 | 11/2012 | Fujisaki | |
| 8,676,273 B1 | 3/2014 | Fujisaki | |
| 8,719,534 B1 | 5/2014 | Ray, III et al. | |
| 8,812,651 B1 | 8/2014 | Eriksen et al. | |
| 9,141,420 B2* | 9/2015 | Chang | G06F 9/45558 |
| 9,146,769 B1* | 9/2015 | Shankar | H04L 67/10 |
| 9,258,666 B2 | 2/2016 | Agrawal et al. | |
| 9,785,478 B1* | 10/2017 | Babu B R | H04L 67/10 |
| 9,940,148 B1 | 4/2018 | Dannowski | |
| 11,089,105 B1* | 8/2021 | Karumbunathan | G06F 16/275 |
| 11,301,407 B2* | 4/2022 | Sen | G06F 3/0619 |
| 2003/0184651 A1 | 10/2003 | Ohsawa et al. | |
| 2005/0120187 A1 | 6/2005 | Suzuoki et al. | |
| 2006/0094512 A1 | 5/2006 | Yoshino et al. | |
| 2006/0100021 A1 | 5/2006 | Yoshino et al. | |
| 2006/0111190 A1 | 5/2006 | Yoshino et al. | |
| 2006/0153342 A1 | 7/2006 | Sasaki | |
| 2006/0171713 A1 | 8/2006 | Feng | |
| 2007/0079307 A1* | 4/2007 | Dhawan | H04L 61/2596 |
| | | | 718/1 |
| 2008/0097919 A1 | 4/2008 | Szucs | |
| 2008/0235361 A1* | 9/2008 | Crosbie | G06F 9/5027 |
| | | | 709/223 |
| 2008/0313349 A1 | 12/2008 | Nickoll et al. | |
| 2009/0240790 A1 | 9/2009 | Utsunomiya et al. | |
| 2010/0042636 A1* | 2/2010 | Lu | H04L 67/08 |
| | | | 707/E17.044 |
| 2011/0109950 A1 | 5/2011 | Ito | |
| 2011/0126047 A1* | 5/2011 | Anderson | H04L 63/08 |
| | | | 709/224 |
| 2012/0117563 A1* | 5/2012 | Chang | G06F 9/45558 |
| | | | 718/1 |
| 2012/0327953 A1 | 12/2012 | Vokkarane et al. | |
| 2013/0262390 A1* | 10/2013 | Kumarasamy | G06F 9/5077 |
| | | | 707/649 |
| 2014/0019621 A1* | 1/2014 | Khan | H04L 47/781 |
| | | | 709/226 |
| 2014/0181984 A1* | 6/2014 | Kundu | G06F 21/64 |
| | | | 726/26 |
| 2014/0258533 A1* | 9/2014 | Antony | H04L 67/1097 |
| | | | 709/226 |
| 2014/0365927 A1 | 12/2014 | Sakai | |
| 2015/0363219 A1* | 12/2015 | Kasturi | H04L 67/1004 |
| | | | 718/1 |
| 2016/0014213 A1 | 1/2016 | Ajitomi et al. | |
| 2017/0235817 A1* | 8/2017 | Deodhar | G06F 16/9535 |
| | | | 707/736 |
| 2018/0014295 A1 | 1/2018 | Nishiguchi | |
| 2018/0026733 A1 | 1/2018 | Yang et al. | |
| 2018/0027598 A1 | 1/2018 | Roquemore, II et al. | |
| 2018/0108961 A1 | 4/2018 | Papp et al. | |
| 2018/0120828 A1 | 5/2018 | Igawa | |
| 2018/0139101 A1 | 5/2018 | Puri et al. | |
| 2018/0191601 A1 | 7/2018 | Micallef | |
| 2018/0234481 A1 | 8/2018 | Bostick et al. | |
| 2019/0042325 A1* | 2/2019 | Nair | G06F 11/3409 |
| 2019/0253458 A1 | 8/2019 | Gnessin et al. | |
| 2019/0254013 A1 | 8/2019 | Chang et al. | |
| 2019/0327144 A1* | 10/2019 | Tembey | G06F 9/45558 |
| 2019/0339320 A1 | 11/2019 | Dzafic | |
| 2020/0218684 A1* | 7/2020 | Sen | G06F 13/4027 |
| 2020/0245210 A1 | 7/2020 | Fotheringham et al. | |
| 2020/0412657 A1 | 12/2020 | Jang et al. | |
| 2021/0105338 A1 | 4/2021 | Oyman et al. | |
| 2021/0240479 A1 | 8/2021 | Reid | |
| 2022/0158756 A1 | 5/2022 | Wang et al. | |
| 2023/0336629 A1 | 10/2023 | Ohara et al. | |

FOREIGN PATENT DOCUMENTS

| | | |
|---|---|---|
| JP | A-2003-535526 | 11/2003 |
| JP | A-2005-064970 | 3/2005 |
| JP | A-2006-527541 | 11/2006 |
| JP | A-2010-521761 | 6/2010 |
| JP | A-2012-505561 | 3/2012 |
| JP | A-2015-065527 | 4/2015 |
| JP | A-2015-527649 | 9/2015 |
| KR | 10-2014-0003200 A | 1/2014 |
| KR | 20140003200 A * | 4/2014 |
| WO | WO 2001/93607 A1 | 12/2001 |
| WO | WO 2004/111775 A2 | 12/2004 |
| WO | WO 2010/041582 A1 | 4/2010 |
| WO | WO 2015/029416 | 3/2015 |
| WO | WO 2020/143380 | 7/2020 |

OTHER PUBLICATIONS

Bijoy Chand Chatterjee et al., "Routing and Wavelength Assignment for WDM-based Optical Networks," Springer, pp. 35-43, vol. 410, 2017.

International Search Report in International Appln. No. PCT/JP2020/036303, dated Feb. 2, 2021, 6 pages (with English Translation).

International Search Report in International Appln. No. PCT/JP2020/039655, dated Feb. 16, 2021, 6 pages (with English Translation).

K. Yamaguchi et al., "MxN Wavelength Selective Switches Using Beam Splitting by Space Light Modulators," IEEE Photonics Journal, vol. 8, No. 1, Feb. 2016.

M. Jinno et al., "An Overview of Elastic Optical Networks," Proceedings of the 2013 IEICE Communications Society Conference, 2013, P. SS-98-SS-99 (No. Translation).

Pegah Afsharlar et al., "Routing and Spectrum Assignment with Delayed Allocation in Elastic Optical Networks," Journal of Optical Communications and Networking, 2017, pp. 1-10.

R. A. Wagner and S. E. Dreyfus, "The Steiner Problem in Graphs," Networks 1, Dreyfus and Wagner, pp. 195-207, 1972.

Ramesh Govindan et al., "An Architecture for Stable, Analyzable Internet Routing," IEEE Network, vol. 13, issue 1, pp. 29-35, 1999.

Ryan Shea and Jiangchuan Liu, "Cloud Gaming: Architecture and Performance," IEEE Network, Jul./Aug. 2013, IEEE 2013, pp. 16-21.

Takamichi Nishijima et al., "On the Impact of Network Environment on Remote Desktop Protocols," IEICE Technical Report CQ2012-21 (Jul. 2012), 2012, pp. 23-28 (English Abstract).

Wei Lu et al., "Dynamic Service Provisioning of Advance Reservation Requests in Elastic Optical Networks," Journal of Lightwave Technology, vol. 31, Issue. 10, 2013, pp. 1621-1627.

Y. Liu et al., "The Degree-Constrained Multicasting Algorithm Using Ant Algorithm," Proceedings of the 10th International Conference on Telecommunications, 2003, pp. 370-374.

Yang Chen et al., "Optical Burst Switching: A New Area in Optical Networking Research," IEEE Network, vol. 18, issue 3, pp. 16-23, 2004.

Jinno et al., "Virtualization in Optical Networks from Network Level to Hardware Level [Invited]," J. Opt. Commun. Netw., Oct. 2013, 5(10):A46-A56.

* cited by examiner

INFORMATION PROCESSING SYSTEM, INFORMATION PROCESSING METHOD AND PROGRAM

CROSS-REFERENCE TO RELATED APPLICATIONS

This application is a continuation of application Ser. No. 18/025,524, filed Mar. 9, 2023, which is a National Stage application under 35 U.S.C. § 371 of International Application No. PCT/JP2020/034724, having an International Filing Date of Sep. 14, 2020, the disclosure of which is considered part of the disclosure of this application, and is incorporated by reference in its entirety into this application.

TECHNICAL FIELD

The present invention relates to an information processing system, an information processing method, and a program technology.

BACKGROUND ART

A user interface (UI) device such as a display, a keyboard, a mouse, and an operation controller is connected to a computing machine, a game machine (hereinafter referred to as a "computing machine"), or the like, and is operated. In many computing machines 901, as illustrated in FIG. 15, a UI device 902 in the place of the user is connected to the computing machine 901 also installed at hand (in a user base 900), in a wired or wireless manner. There also are cases where a sensor 903 that detects movement of a hand, the face, the body, or the like of the user US is connected to the computing machine 901 in a wired or wireless manner. FIG. 15 is a diagram illustrating an example configuration in which a computing machine and a UI device according to a conventional technology are connected directly to each other.

An apparatus called a KVM extender (KVM=keyboard, video, mouse; hereinafter referred to as an extender) is used as an apparatus that enables a UI device to be installed at a location physically away from a computing machine. In an example configuration illustrated in FIG. 16, the UI device 902 at hand is connected to an extender 904, and is connected to a computing machine 911 in which an extender 912 to face the extender 904 is installed via a transmission channel 915. Note that the computing machine 911 and the extender 912 are installed in a computing machine base 910, for example. FIG. 16 is a diagram illustrating an example of connection between a UI device and a computing machine using extenders according to a conventional technology. Further, in a case where there is a plurality of computing machine bases 910-1 to 910-3 as illustrated as an example configuration using extenders in FIG. 17, a switch 921 switches the connection between the extender 904 of the user base 900 and the computing machine bases 910-1 to 910-3. FIG. 17 is a diagram illustrating another example of connection between a UI device and computing machines using extenders according to a conventional technology.

Further, other conventional technologies that enable installation of UI devices and computing machines at physically separated places include a remote desktop function (see Non Patent Literature 1, for example). FIG. 18 is a diagram illustrating an example configuration of a remote desktop according to a conventional technology. UI devices (902-1 to 902-3) in the places (user bases 900-1 to 900-3) of users (US1 to US3) are connected to computing machines (901-1 to 901-3) at hand, and these computing machines are connected to computing machines (911-1 to 911-3) at a remote location (a computing machine base 910A, for example) via networks (915-1 to 915-3) such as the Internet. In a remote desktop, it is possible to operate a program being run in a remote computing machine, using a UI device at hand, and it is also possible to change connection destination computing machines.

CITATION LIST

Non Patent Literature

Non Patent Literature 1: Takamichi NISHIJIMA, Yuto NAKAI, Hiroyuki OSAKI, et al. "On the Impact of Network Environment on Remote Desktop Protocols", IEICE Technical Report CQ2012-21 (2012-7), Institute of Electronics, Information and Communication Engineers (IEICE) 2012, p 23-28

SUMMARY OF INVENTION

Technical Problem

The conventional technologies are modes in which a user uses a computing machine in a certain computing machine base located at a physically distant place, in a case where a UI device and the computing machine are at physically separated places. According to the conventional technologies, in a case where a computing machine is used from a user base close to the computing machine base, a preferred operational feeling can be obtained because the delay time is short. However, in a case where the user moves away from the computing machine base, the delay time becomes longer, and the operational feeling is degraded.

For example, in a case where the user base and the computing machine base are connected by a 10 km optical fiber, the optical reciprocation time is 0.1 ms. In a case where the user moves to another user base, and the user base and the computing machine base are connected by a 1000 km optical fiber, the optical reciprocation time is 10 ms, and the user's operational feeling is greatly degraded.

In view of the above circumstances, the present invention aims to provide a technology that enables a change in the connection between a user interface device and a computing machine without degradation in the operational feeling when the computing machine being used is changed in a case where the user interface and the computing machine are installed at separated places.

Solution to Problem

One aspect of the present invention is an information processing system that includes: a computing machine installed in a computing machine base, and a first transmitting/receiving apparatus connected to the computing machine; a second transmitting/receiving apparatus installed in a user base that is used by a user, and a device connected to the second transmitting/receiving apparatus; and a control apparatus configured to control connection between one first transmitting/receiving apparatus among a plurality of the first transmitting/receiving apparatuses and the second transmitting/receiving apparatus. The control apparatus is configured to change a first connection between the second transmitting/receiving apparatus and the first transmitting/receiving apparatus to a second connection between the second transmitting/receiving apparatus and another one of the first transmitting/receiving apparatuses, and copy computing machine state information about a pre-change computing machine that is the computing machine before the change, into a post-change computing machine that is the computing machine after the change, the computing machine state information being copied from the pre-change computing machine.

One aspect of the present invention is an information processing method implemented in an information processing system that includes: a computing machine installed in a computing machine base, and a first transmitting/receiving apparatus connected to the computing machine; a second transmitting/receiving apparatus installed in a user base that is used by a user, and a device connected to the second transmitting/receiving apparatus; and a control apparatus configured to control connection between one first transmitting/receiving apparatus among a plurality of the first transmitting/receiving apparatuses and the second transmitting/receiving apparatus. The information processing method includes, by the control apparatus, changing a first connection between the second transmitting/receiving apparatus and the first transmitting/receiving apparatus to a second connection between the second transmitting/receiving apparatus and another one of the first transmitting/receiving apparatuses, and copying computing machine state information about a pre-change computing machine that is the computing machine before the change, into a post-change computing machine that is the computing machine after the change, the computing machine state information being copied from the pre-change computing machine.

One aspect of the present invention is a program that is executed in an information processing system that includes: a computing machine installed in a computing machine base, and a first transmitting/receiving apparatus connected to the computing machine; a second transmitting/receiving apparatus installed in a user base that is used by a user, and a device connected to the second transmitting/receiving apparatus; and a control apparatus configured to control connection between one first transmitting/receiving apparatus among a plurality of the first transmitting/receiving apparatuses and the second transmitting/receiving apparatus. The program causes a computer of the control apparatus to: change a first connection between the second transmitting/receiving apparatus and the first transmitting/receiving apparatus to a second connection between the second transmitting/receiving apparatus and another one of the first transmitting/receiving apparatuses; and copy computing machine state information about a pre-change computing machine that is the computing machine before the change, into a post-change computing machine that is the computing machine after the change, the computing machine state information being copied from the pre-change computing machine.

Advantageous Effects of Invention

According to the present invention, when a user interface device and a computing machine are installed at separated places, and the computing machine to be used is changed, the connection between the user interface device and the computing machine can be changed without degradation in the operational feeling.

DESCRIPTION OF EMBODIMENTS

The following is a description of embodiments of the present invention, with reference to the drawings.

Figure 1:
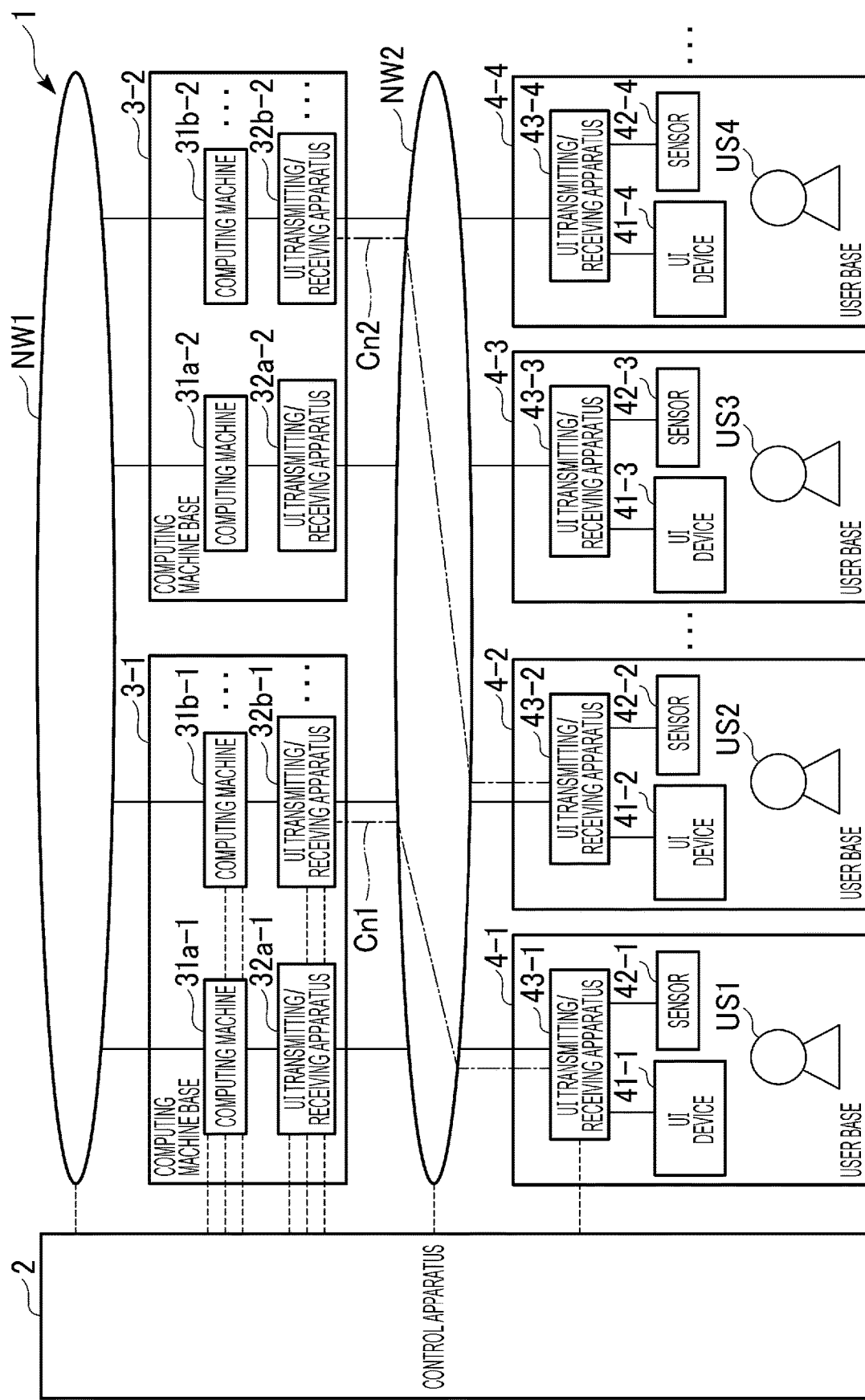
FIG. 1 is a diagram illustrating an example overall configuration of an information processing system according to an embodiment.

FIG. 1 is a diagram illustrating an example overall configuration of an information processing system according to this embodiment. As illustrated in FIG. 1, an information processing system 1 includes a control apparatus 2, computing machine bases 3 (3-1, 3-2, . . . , and 3-*n* (n being an integer of 1 or greater)), user bases 4 (4-1, 4-2, 4-3, 4-4, . . . , and 4-*m* (m being an integer of 1 or greater)), a first network NW1, and a second network NW2.

In a computing machine base 3, one or a plurality of computing machines 31 and one or a plurality of UI transmitting/receiving apparatuses 32 are installed. In a computing machine base 3, computing machines 31 (31*a-n*, 31*b-n*, . . . ) and UI transmitting/receiving apparatuses 32

(32a-n, 32b-n, . . . ) (first transmitting/receiving apparatuses) are installed. Note that the computing machine bases 3 are illustrated, with some of the components being omitted. An example configuration of the computing machine base 3 will be described later with reference to FIG. 2 and others.

In a user base 4, a UI device 41 (41-m), a sensor 42 (42-m), and a UI transmitting/receiving apparatus 43 (43-m) (a second transmitting/receiving apparatus) are installed.

The information processing system 1 includes one or a plurality of computing machine bases 3.

The control apparatus 2 controls the connection relationship between the UI transmitting/receiving apparatuses 43 of the user bases 4 and the UI transmitting/receiving apparatuses 32 of the computing machine bases 3. The control apparatus 2 is connected to the computing machines 31 and the UI transmitting/receiving apparatuses 32 of the computing machine bases 3, a communication apparatus (not shown) forming the second network NW2, and the UI transmitting/receiving apparatuses 43 of the user bases 4, and can check the configuration information about each apparatus and change configurations. The control apparatus 2 also performs roaming control on the environmental information that is used in a user base 4 in a case where the user has moved. The control apparatus 2 is connected to the computing machine bases 3, the user bases 4, the first network NW1, and the second network NW2 in a wired or wireless manner.

Note that the control apparatus 2 is formed with a processor such as a central processing unit (CPU) and a memory. All or some of the functions of the control apparatus 2 may be formed with hardware such as an application specific integrated circuit (ASIC), a programmable logic device (PLD), or a field programmable gate array (FPGA). The program may be recorded in a computer-readable recording medium. The computer-readable recording medium is a portable medium such as a flexible disk, a magneto-optical disk, a ROM, a CD-ROM, or a semiconductor memory device (for example, a solid state drive (SSD)), or a storage device such as a hard disk or a semiconductor memory device built in a computer system, for example. The program may be transmitted via a telecommunication line.

The first network NW1 includes the Internet, for example, and includes a communication network and a roaming data transfer network. Note that the communication network and the roaming data transfer network may be integrated or be independent of each other. The first network NW1 may also have an authentication function.

The second network NW2 may be a wired network or a wireless network, have any appropriate physical or logical topology, and be a circuit switched network or a packet switched network.

Next, a computing machine base 3 is described.

A computing machine base 3 is a data center, a communication building, a server room, or the like, for example. Note that the computing machines 31 and the UI transmitting/receiving apparatuses 32 may be integrated.

A computing machine 31 may be a physical computing machine or a logical computing machine (a virtual computing machine). In the case of a virtual computing machine, a CPU, a graphics processing unit (GPU), a memory, a storage, and the like are virtualized, for example. Alternatively, a computing machine 31 may be a game machine. A computing machine 31 is connected to another computing machine or a server (not shown) of a data center via the first network NW1. A computing machine 31 is connected to a UI transmitting/receiving apparatus 32, to exchange user interface information such as a display signal and operating information about the computing machine 31. Specific examples of display signals include high-definition multimedia interface (HDMI, registered trademark) and DisplayPort signals, and examples of operating information signals include universal serial bus (USB) signals. Examples of signals obtained by combining a display signal and operating information include USB4 and Thunderbolt (registered trademark) 3 signals. Note that one user may boost and use a plurality of physical GPUs in cooperation.

A UI transmitting/receiving apparatus 32 receives a display signal and operating information, and converts the display signal and the operating information into a signal format that enables long-distance communication via the second network NW2. A UI transmitting/receiving apparatus 32 is also connected to the UI transmitting/receiving apparatus 43 of a user base 4 via the second network NW2. The signal format that enables long-distance communication is Ethernet (registered trademark) or an optical transport network (OTN), for example. Note that an example configuration of a UI transmitting/receiving apparatus 32 will be described later.

Next, a user base 4 is described.

A user base 4 is a base where a user US (US1, . . . ) performs work, play games, and the like, and may be a home, a company office, a business rental space, a game arcade, or the like, for example.

The UI device 41 is a device related to a user interface, and may be a display, a keyboard, a mouse, an operating controller (an actuator), a camera, a virtual reality (VR) headset, an augmented reality (AR) headset, a microphone, a speaker, or the like, for example. Alternatively, the UI device 41 may be any other appropriate device that inputs and outputs five human senses (touch, eyesight, hearing, smell, and taste) to and from a computing machine 31. The UI device 41 and the UI transmitting/receiving apparatus 43 are connected in a signal format such as HDMI, DisplayPort, or USB, for example.

The sensor 42 is a sensor that detects movement of a hand, the face, the body, and the like of the user US, a location sensor, an altitude sensor, a velocity sensor, an acceleration sensor, a temperature sensor, a humidity sensor, a pressure sensor, a vibration sensor, an optical sensor, a sound sensor, an electric field sensor, a magnetic field sensor, or the like, for example. The sensor 42 and the UI transmitting/receiving apparatus 43 are connected in a signal format such as USB, for example.

The UI transmitting/receiving apparatus 43 is connected to a UI transmitting/receiving apparatus 32 of a computing machine base 3 via the second network NW2. Note that the second network NW2 has a switching function, and can flexibly change the connection relationship between the UI transmitting/receiving apparatuses 32 of the computing machine bases 3 and the UI transmitting/receiving apparatuses 43 of the user bases 4. Note that a plurality of UI signals may be multiplexed in an output of the UI transmitting/receiving apparatus 43. Note that at least either the UI device 41 or the sensor 32 is required to be connected to the UI transmitting/receiving apparatus 43.

Next, an example of connection between the user bases 4 and the computing machine bases 3 is described.

In the example illustrated in FIG. 1, two users US1 and US2 use computing machines 31 via the second network NW2.

In a first channel Cn1, the UI transmitting/receiving apparatus 43-1 of the user base 4-1 and the UI transmitting/receiving apparatus 32b-1 of the computing machine base 3-1 are connected via the second network NW2. In a second channel Cn2, the UI transmitting/receiving apparatus 43-2 of the user base 4-2 and the UI transmitting/receiving apparatus 32b-2 of the computing machine base 3-2 are connected via the second network NW2. Note that the connection relationship between the UI transmitting/receiving apparatuses (32 and 43) is controlled by the control apparatus 2.

Next, an example configuration of the computing machine bases and the second network are described.

Figure 2:
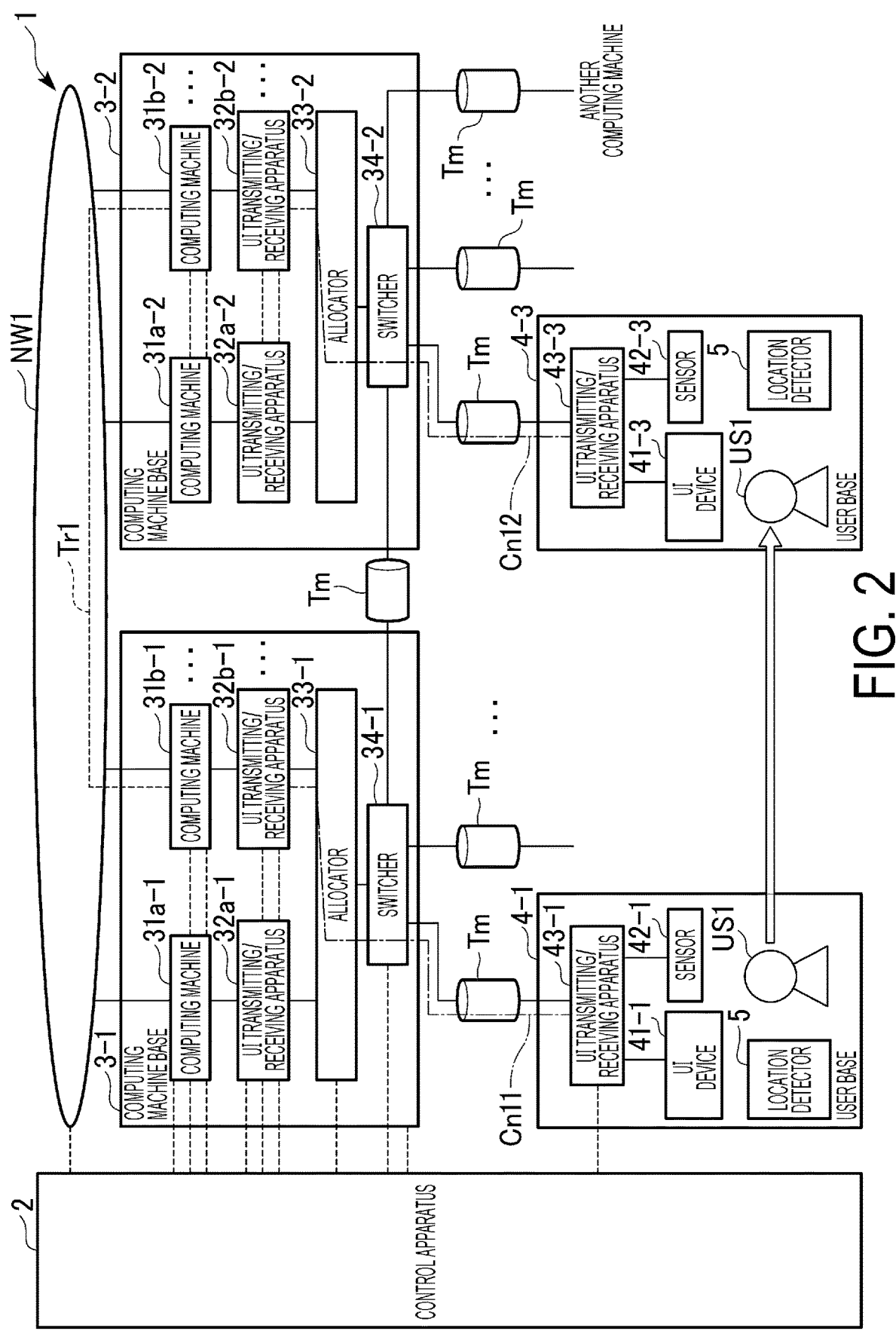
FIG. 2 is a diagram illustrating an example configuration of computing machine bases and an example of a second network according to an embodiment.

FIG. 2 is a diagram illustrating an example configuration of the computing machine bases and an example of the second network according to this embodiment. In the example illustrated in FIG. 2, at least one computing machine 31 (31a-1, 31b-2, 31a-2, 31b-2), at least one UI transmitting/receiving apparatus 32 (32a-1, 32b-2, 32a-2, 32b-2), an allocator 33 (33-1, 33-2), and a switcher 34 (34-1, 34-2) are installed in a computing machine base 3 (3-1, 3-2), for example.

Each user base 4 is connected to the switcher 34 of a computing machine base 3 via a transmission channel Tm. A transmission channel Tm may be a colored interface (IF) based on a wavelength division multiplexing (WDM) signal according to a wavelength division multiplexing scheme or a grey IF based on a non-WDM signal, for example. A switcher 34 is also connected to the switcher 34 of another computing machine base 3 via a transmission channel Tm, and can flexibly change the connection relationship between the UI transmitting/receiving apparatuses (32 and 43). A switcher 34 is connected to the allocator 33 of the same computing machine base 3, and can set to which computing machine 31 of the computing machine base 3 the allocator 33 is to be connected.

A switcher 34 (a switch) switches transmission channels Tm, under the control of the control apparatus 2. A switcher 34 is an optical switch, an electrical switch, or a robot panel switch, for example.

An allocator 33 (a switch) switches the UI transmitting/receiving apparatuses 32 connected to the UI transmitting/receiving apparatuses 43 of the user bases 4, under the control of the control apparatus 2. An allocator 33 is an optical switch, an electrical switch, or a robot panel switch, for example.

Figure 3:
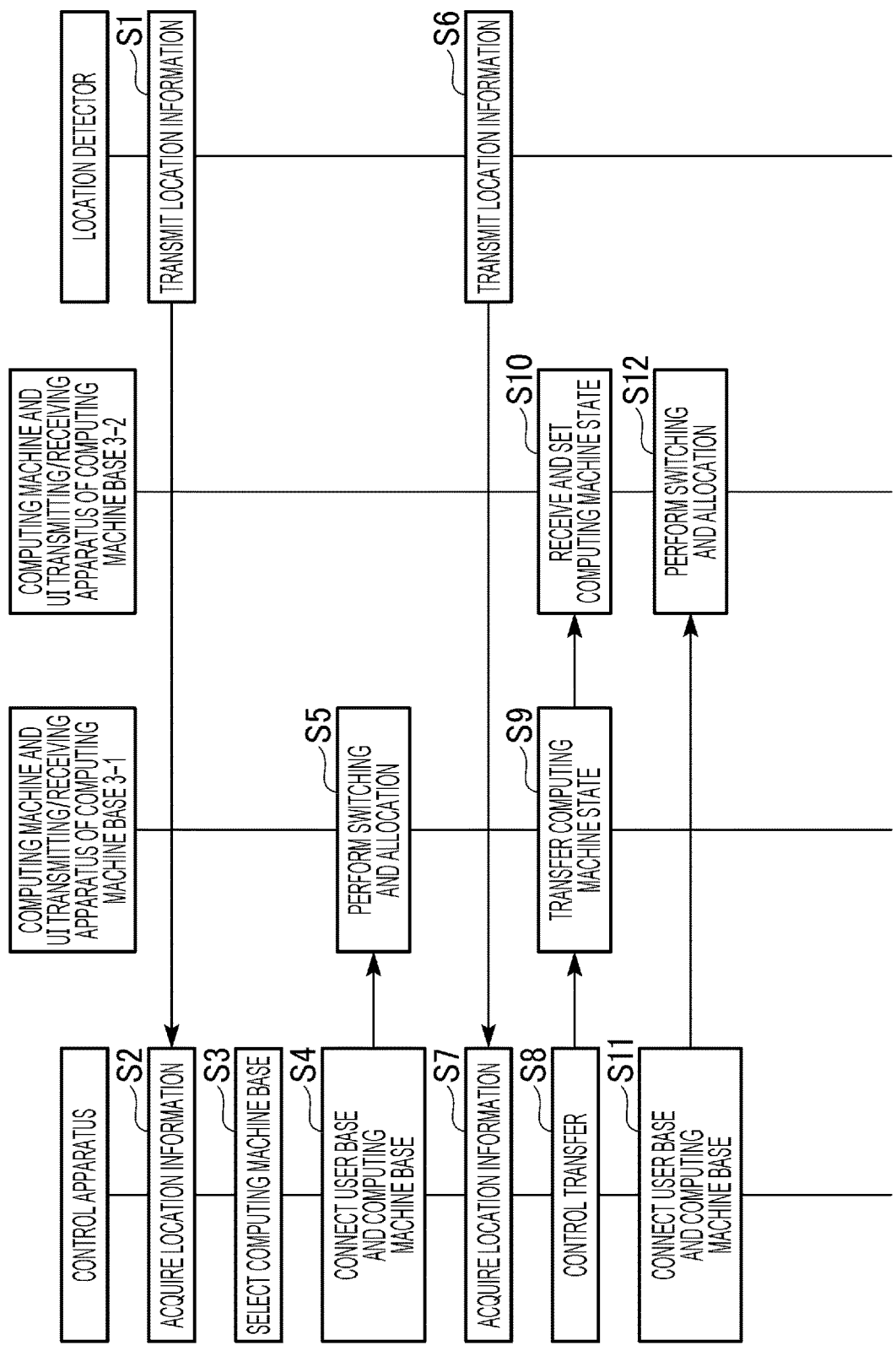
FIG. 3 is a flowchart of an example of the processing procedures to be carried out by an information processing system according to an embodiment.

Next, an operation to be performed when a user US moves between user bases 4 is described, with reference to FIGS. 2 and 3. FIG. 3 is a sequence diagram of an example of the processing procedures to be performed by the information processing system according to this embodiment. Note that it is assumed that the user US1 carries a location detector 5. The location detector 5 is a global positioning system (GPS) receiver built in a smartphone or the like, for example.

The user US1 is using the UI device 41-1 and the like in the user base 4-1 at time T1. The location detector 5 detects location information about the user US1, and transmits the detected location information to the control apparatus 2 (step S1). The control apparatus 2 acquires the location information transmitted by the location detector 5. Note that the control apparatus 2 may detect that the user US1 has started using the information processing system 1, and perform setting. On the basis of the location information or use start information (login information, for example), the control apparatus 2 detects the user base 4-1 being used by the user US1 (step S2).

At time T1, the control apparatus 2 selects the computing machine base 3 closest to the user base 4-1 on the basis of the location information or the use start information, or on the basis of a movement prediction about the user to shorten the transmission delay time. For example, the control apparatus 2 may select the computing machine base 3 on the basis of the distance from the user base 4-1. In this case, the control apparatus 2 may store information about the distances between the user bases 4 and the computing machine bases 3 in advance. In a case where there are no available computing machines 31 in the computing machine base 3, the control apparatus 2 may sequentially search a plurality of computing machine bases 3 close to the user base 4 (step S3). In the example illustrated in FIG. 2, the control apparatus 2 controls the switcher 34-1 and the allocator 33-1 of the computing machine base 3-1 so as to connect the UI transmitting/receiving apparatus 43-1 to the UI transmitting/receiving apparatus 32b-1 of the computing machine base 3-1 by the connection relationship in a channel Cn11 (step S4). The switcher 34-1 and the allocator 33-1 of the computing machine base 3-1 switch the transmission channels Tm to be connected under the control of the control apparatus 2, allocate the UI transmitting/receiving apparatus 32b-1, and connect the UI transmitting/receiving apparatus 43-1 and the UI transmitting/receiving apparatus 32b-1 (step S5). As a result, the UI transmitting/receiving apparatus 43-1 is connected by the connection relationship in the channel Cn11, and thus, the user US1 can use the computing machine 31b-1 of the computing machine base 3-1.

The user US1 moves from the user base 4-1 to the user base 4-3, and starts using the UI device 41-3 and the like in the user base 4-3 at time T2. The location detector 5 detects location information about the user US1, and transmits the detected location information to the control apparatus 2 (step S6).

The control apparatus 2 obtains the location information about the user US1 from the location detector 5. The control apparatus 2 grasps the user location from a GPS satellite. As the user US1 moves, the control apparatus 2 identifies the user base 4 that can be used from the user location, and further selects the computing machine base 3 that can be used from the user base 4. The control apparatus 2 performs such a process at predetermined time intervals or when location information is acquired, for example. In a case where the user US1 further continues to move, the control apparatus 2 may select a candidate user base 4 and a candidate computing machine base 3 from moment to moment (step S7).

When the candidate user base and the candidate computing machine base are selected, the control apparatus 2 controls the computing machine base 3 to copy computing machine state information about the computing machine base used so far into a computing machine of the computing machine base that can be a new place to be used (step S8). In the example illustrated in FIG. 2, under the control of the control apparatus 2, the computing machine 31b-1 of the computing machine base 3-1 transfers the computing machine state information to the computing machine 31b-2 of the computing machine base 3-2 via the first network NW1 (step S9). The computing machine 31b-2 of the computing machine base 3-2 then receives the computing machine state information, and sets the received computing machine state information in the computing machine 31b-2 (step S10). Thus, according to this embodiment, when the user US1 start using the computing machine again, the computing machine state information can be copied before the user starts using the post-change computing machine. Note that the computing machine state information is information regarding the state of the computing machine 31 that has been used by the user before the change, and is CPU state information (the respective pieces of information about the number of cores to be used, the number of clocks, the on/off state of an energy saving mode, the state of a program counter, the state of a register, and the like, for example) that has been set by the user or the operating system (OS) of the computing machine 31, GPU state information (the respective pieces of information about the number of cores to be used, the number of clocks, the on/off state of the energy saving mode, and the like, for example), memory state information (the information stored in a memory, for example), storage state information (the information stored in a storage, for example), a combination of these sets of information, or the like.

Further, the control apparatus 2 sets the connection relationship for connecting candidate computing machine bases and the UI transmitting/receiving apparatuses of the user bases (step S11). In the example illustrated in FIG. 2, the new user base and a computing machine base are connected by a channel Cn12. The switcher 34-2 and the allocator 33-2 of the computing machine base 3-2 switch the transmission channels Tm to be connected under the control of the control apparatus 2, allocate the UI transmitting/receiving apparatus 32b-2, and connect the UI transmitting/receiving apparatus 43-3 and the UI transmitting/receiving apparatus 32b-2 (step S12).

In this embodiment, through such a process, the state of the computing machine is copied before a change to the post-change computing machine to be connected to the user base 4 predicted beforehand, on the basis of a movement prediction about the user. Thus, according to this embodiment, when the user starts using a computing machine in the new user base, the same state as that of the previous computing machine is copied beforehand into the computing machine in the new computing machine base. According to this embodiment, the user can feel as if the user were using the computing machine the user was using before the movement. However, in the actual state of the computing machine, the computing machine in the computing machine base closest to the new user base is used, for example. Accordingly, the delay time is short, and the operational feeling is not degraded. As a result, according to this embodiment, when a user interface device and a computing machine are installed at separated places, and the computing machine to be used is changed, the connection between the user interface device and the computing machine can be changed without degradation in the operational feeling.

Next, an example configuration of a UI transmitting/receiving apparatus is described.

Figure 4:
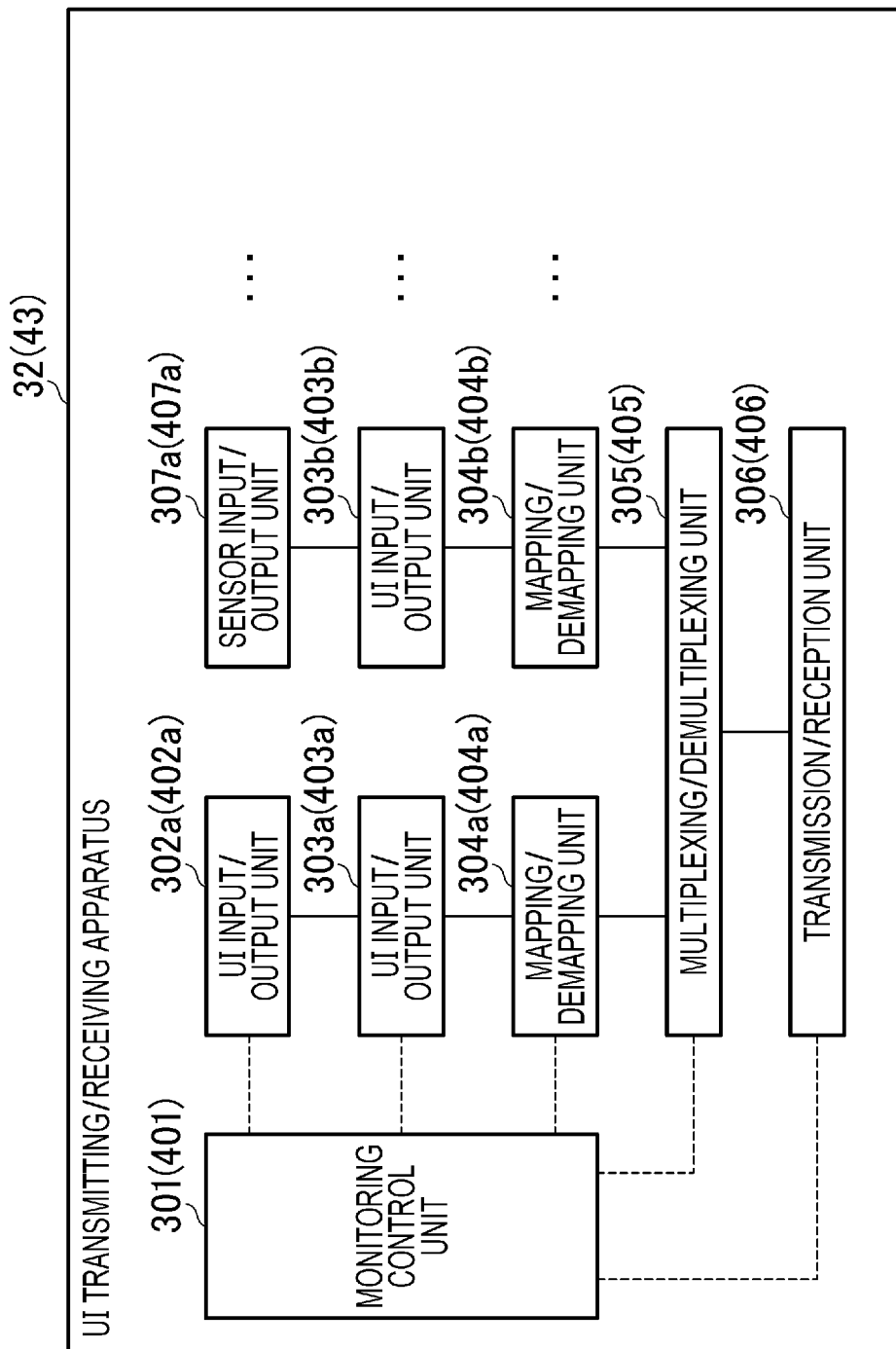
FIG. 4 is a diagram illustrating an example configuration of a UI transmitting/receiving apparatus according to an embodiment.

FIG. 4 is a diagram illustrating an example configuration of a UI transmitting/receiving apparatus according to this embodiment. Although a case where the UI transmitting/receiving apparatuses 32 and the UI transmitting/receiving apparatuses 43 have the same configurations is described in the description below, the configurations may be different. As illustrated in FIG. 4, a UI transmitting/receiving apparatus (32, 43) includes a monitoring control unit 301, at least one UI input/output unit 302 (302a, . . . ) or sensor input/output unit 307 (307a, . . . ), at least one compression/decompression unit 303 (303a, 303b, . . . ), at least one mapping/demapping unit 304 (304a, 304b, . . . ), a multiplexing/demultiplexing unit 305, and a transmission/reception unit 306, for example.

Also, a UI transmitting/receiving apparatus 43 includes a monitoring control unit 401, at least one UI input/output unit 402 (402a, . . . ) or sensor input/output unit 407 (407a, . . . ), at least one compression/decompression unit 403 (403a, 403b, . . . ), at least one mapping/demapping unit 404 (404a, 404b, . . . ), a multiplexing/demultiplexing unit 405, and a transmission/reception unit 406, for example. Note that the configuration illustrated in FIG. 4 is an example, and the present invention is not limited to this.

In the case of a UI transmitting/receiving apparatus 32, the monitoring control unit 301 is connected to the control apparatus 2 by a wired or wireless line, the transmission/reception unit 306 is connected to the allocator 33, and the UI input/output unit 302 and the sensor input/output unit 307 are connected to the computing machine 31.

In the case of a UI transmitting/receiving apparatus 43, the monitoring control unit 401 is connected to the control apparatus 2 by a wired or wireless line, the transmission/reception unit 406 is connected to a transmission channel Tm, the UI input/output unit 402a is connected to the UI device 41, and the sensor input/output unit 407a is connected to the sensor 42. Note that the positions of the transmission/reception unit 406 and the multiplexing/demultiplexing unit 405 may be reversed.

The monitoring control unit 301 is connected to the respective components of the UI transmitting/receiving apparatus 32, and monitors the states of the respective components and changes the settings. The monitoring control unit 301 is connected to the control apparatus 2, and changes the connection relationship of the UI transmitting/receiving apparatus 32, monitors the state of the UI device 41, and performs operation setting.

The monitoring control unit 401 is connected to the respective components of the UI transmitting/receiving apparatus 43, and monitors the states of the respective components and changes the settings. The monitoring control unit 401 is connected to the control apparatus 2, and changes the connection relationship of the UI transmitting/receiving apparatus 43, monitors the state of the UI device 41, and performs operation setting.

The UI input/output unit 302 is connected to a UI signal from the computing machine 31 in the case of a computing machine base 3. The UI signal is any of respective signals of HDMI, DisplayPort, USB, Thunderbolt, Bluetooth (registered trademark), analog audio, and digital audio, for example. The UI input/output unit 302 is connected to the compression/decompression unit 303a.

The UI input/output unit 402 is connected to the UI device 41. The UI input/output unit 402 is connected to the compression/decompression unit 403a.

The sensor input/output unit 307 is connected to a UI signal from the computing machine 31. The sensor input/output unit 307 is connected to the compression/decompression unit 303b.

The sensor input/output unit 407 is connected to the sensor 42. The sensor input/output unit 407 is connected to the compression/decompression unit 403b.

The compression/decompression unit 303 compresses or decompresses the capacity of compressible UI signals, under the control of the monitoring control unit 301. Specific examples of compression include compression of HDMI and DisplayPort signals of display signals, and examples of compression methods include Display Stream Compression (DSC) and VESA Display Compression for Mobile (VDC-M), which are defined by Video Electronics Standards Association (VESA), and Moving Picture Experts Group (MPEG), for example. Note that the compression/decompression unit 303 may not be included. Also, the compression/decompression unit 303 may change compression methods or decompression methods, depending on the state of the transmission channel Tm. For example, the higher the compression rate, the higher the latency of the compression/decompression unit 303. Therefore, to achieve a low latency, the compression/decompression unit 303 uses no compression or a compression method with a low compression rate, for example. The compression/decompression unit 303 is connected to the mapping/demapping unit 304.

The compression/decompression unit 403 performs a process that is the reverse of that performed by the compression/decompression unit 303, under the control of the monitoring control unit 401. The compression/decompression unit 403 is connected to the mapping/demapping unit 404.

The mapping/demapping unit 304 converts a UI signal into a signal format that can be transmitted over a long distance, under the control of the monitoring control unit 301. The signal format is OTN defined by ITU-T or Ethernet defined by IEEE, for example. The mapping/demapping unit 304 is connected to the multiplexing/demultiplexing unit 305.

The mapping/demapping unit 404 converts a UI signal into a signal format that can be transmitted over a long distance, under the control of the monitoring control unit 401. The mapping/demapping unit 404 is connected to the multiplexing/demultiplexing unit 405.

The multiplexing/demultiplexing unit 305 multiplexes or demultiplexes a plurality of signals, under the control of the monitoring control unit 301. For example, when OTN is used as the signal format that can be transmitted over a long distance, the multiplexing/demultiplexing unit 305 multiplexes a plurality of optical data unit (ODU) signals output from the mapping/demapping unit 304 into an ODU signal having a larger capacity. The multiplexing/demultiplexing unit 305 is connected to the transmission/reception unit 306.

The multiplexing/demultiplexing unit 405 performs a process that is the reverse of that performed by the multiplexing/demultiplexing unit 305, under the control of the monitoring control unit 401. The multiplexing/demultiplexing unit 405 is connected to the transmission/reception unit 406.

The transmission/reception unit 306 transmits or receives a signal to be transmitted through the second network NW2, under the control of the monitoring control unit 301. For example, in the case of OTN, the transmission/reception unit 306 transmits or receives an optical transport unit (OTU) signal. The transmission/reception unit 306 of the computing machine base 3 is connected to the second network NW2, and thus, is connected to the UI transmitting/receiving apparatus 43 of the user base 4 via the allocator 33, the switcher 34, and the transmission channel Tm. The information capacity to be transmitted or received is OTUOLL, OTU1, OTU2, OTU2e, OTU3, OTU4, OTUCn, gigabit Ethernet (GbE), 2.5 GbE, 5 GbE, 10 GbE, 25 GbE, 50 GbE, 100 GbE, 400 GbE, or the like, for example. Note that the transmission/reception unit 306 may change the capacity, depending on the state of the transmission channel Tm.

The transmission/reception unit 406 transmits or receives information to and from the computing machine base 3 via the transmission channel Tm, under the control of the monitoring control unit 401.

As described above, in this embodiment, the UI device 41 and the sensor 42 of a user base 4 are connected to a computing machine 31 of a computing machine base 3 via the second network NW2. Also, in this embodiment, when the user moves between user bases 4, the user base 4 and the computing machine base 3 being used by the user change, but the state of the pre-change computing machine 31 is copied into the computing machine 31 at the movement destination in advance. Thus, according to this embodiment, the user can use computing machines in the same environment, without degradation in the operational feeling.

Although the roaming in the computing machine environment when the user moves has been described in the above example, the present invention is not limited to this.

For example, there may be a case where the user does not move, but a high-performance computing machine is required at a certain timing. Even in such a case, when the connection is switched from the currently connected computing machine to a computing machine with higher performance, this embodiment is adopted, so that the computing machine environment is changed from the computing machine used so far to the computing machine to be used thereafter. Thus, according to this embodiment, it is possible to change computing machines, without changing use environments. Note that, in a case where the user does not move as described above, the control apparatus 2 detects that the computing machine 31 that has been used by the user is to be replaced, and transfers the state of the computing machine 31 at the time of replacement of the computing machine 31, for example.

Figure 5:
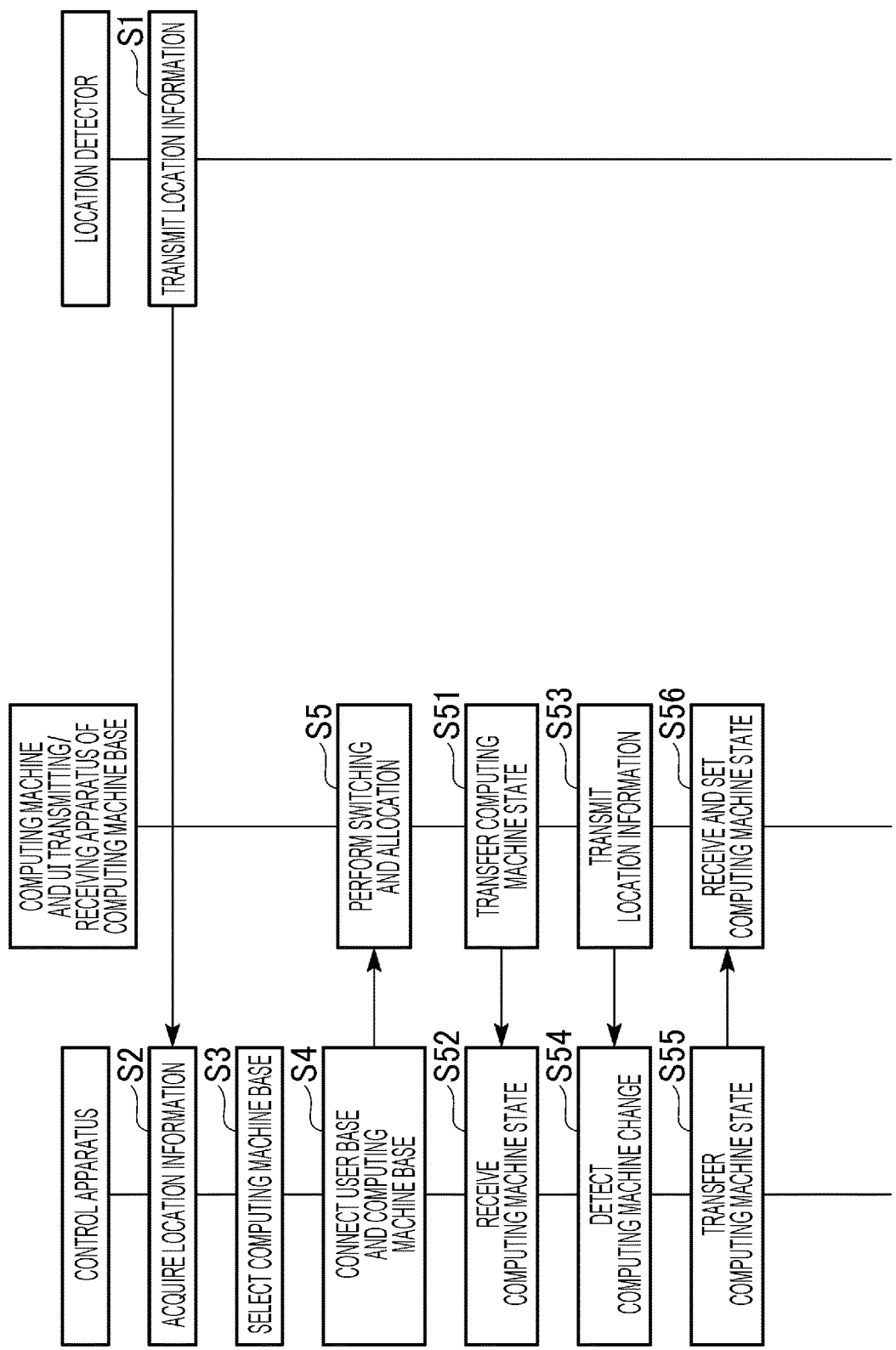
FIG. 5 is a flowchart of an example of the processing procedures to be carried out by a computing machine system according to an embodiment in a case where computing machines are changed even though the user has not moved.

FIG. 5 is a flowchart of an example of the processing procedures to be carried out by the computing machine system according to this embodiment in a case where computing machines are changed even though the user has not moved.

After the process in step S5, the computing machine 31 transmits the computing machine state information to the control apparatus 2 (step S51). The control apparatus 2 receives the computing machine state information transmitted by the computing machine 31, and stores the received computing machine state information (step S52).

On the basis of a change prediction about the user, the computing machine base 3-1 replaces the computing machine with another computing machine, or transmits, to the control apparatus 2, change information indicating that the computing machines 31 are to be changed (step S53). Receiving the change instruction, the control apparatus 2 detects that the computing machines 31 are to be changed (step S54).

The control apparatus 2 transfers the pre-change computing machine state information to the post-change computing machine 31 in the computing machine base 3-1 (step S55). The post-change computing machine 31 receives the pre-change computing machine state information, and sets the received computing machine state information in the computing machine 31 (step S56).

Note that the example process shown in FIG. 5 is an example, and the present invention is not limited to this. For example, in a case where the computing machine 31a-1 is to be replaced, the state of the computing 31a-1 may be transferred to another computing machine 31b-1 or the like of the computing machine base 3-1. Further, after the computing machine 31a-1 is replaced with a new computing machine, the computing machine 31b-1 may transfer the state of the computing machine 31a-1.

As described above, in this embodiment, the state of the pre-change computing machine is copied into the post-change computing machine in advance, on the basis of a change prediction about a user. As a result, according to this embodiment, when a user interface device and a computing machine are installed at separated places, and the computing machine to be used is changed, the connection between the user interface device and the computing machine can be changed without degradation in the operational feeling.

Here, an example of a method for changing the computing machines on the basis of a user change prediction is described. The computing machine 31 that is connected to a user base 4 and is being used acquires the operating rate of the CPU or the operating rate of the GPU, for example, and transmits the acquired operating rate of the CPU or the operating rate of the GPU to the control apparatus 2 at predetermined intervals, for example. In a case where a state in which the operating rate of the CPU or the operating rate of the GPU is equal to or higher than a threshold lasts over a predetermined time, the control apparatus 2 predicts an insufficient ability of the computing machine or the GPU being used by the user, and searches for a computing machine having higher performance than the computing machine 31 being currently used, in the vicinity of the current computing machine base, for example. The control apparatus 2 then transfers (copies) the state of the pre-change computing machine, to the predicted post-change computing machine 31. Note that the changing method described above is an example, and the present invention is not limited to this. For example, in another example, computing machines are changed as intended by the user. In such a case, when processing with a heavy load (editing a video image, for example) is to be performed, the control apparatus 2 may change computing machines when the user clicks a button for issuing an instruction to switch to a high-performance computing machine via a website or the like that provides a computing machine service, for example.

Thus, according to this embodiment, in a case where the user is performing work with a borrowed computing machine 31, for example, the work can be seamlessly continued even after the computing machine 31 is changed to another computing machine.

Example 1

Figure 6:
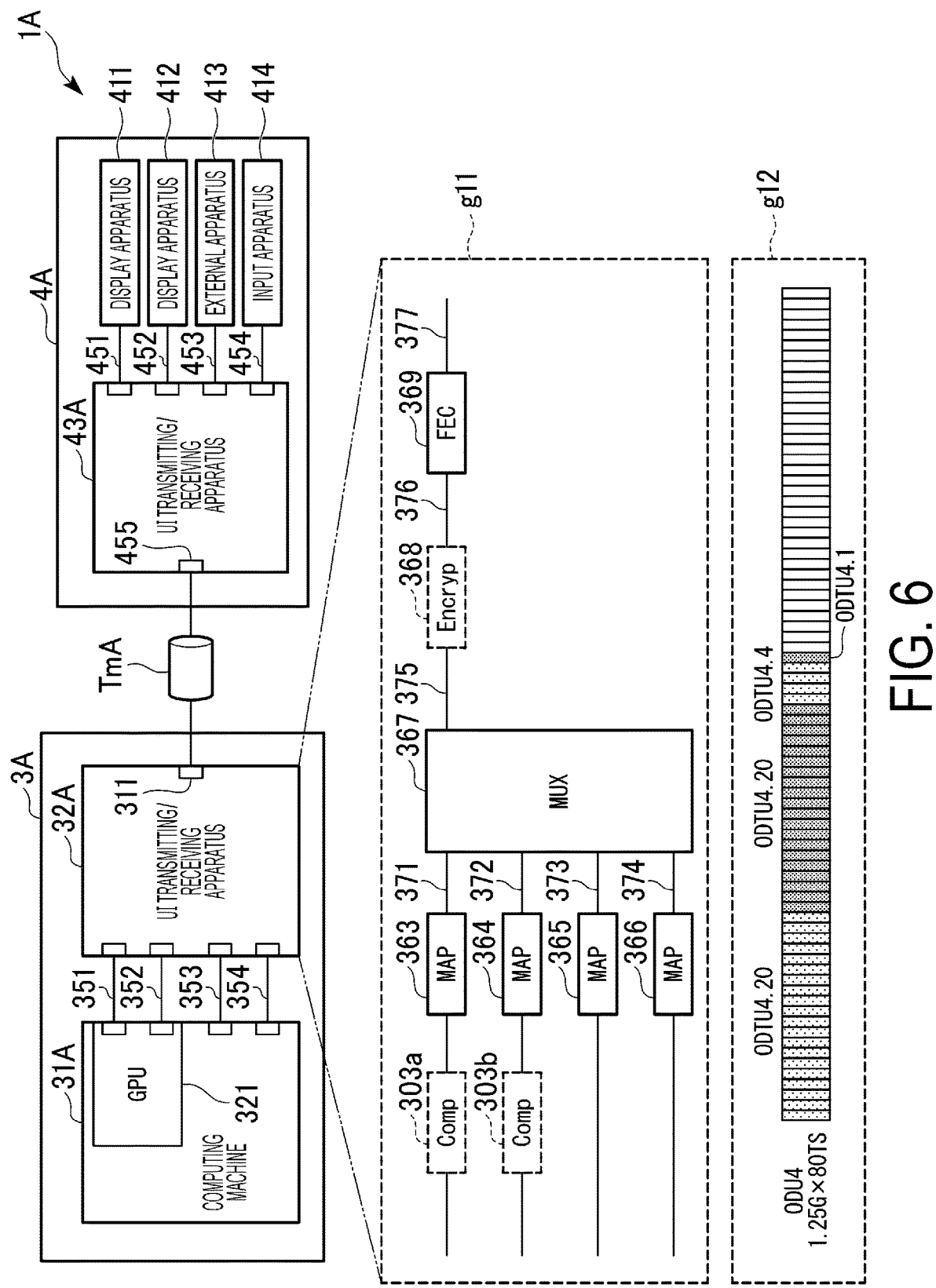
FIG. 6 is a diagram illustrating a first specific example configuration of an information processing system.

FIG. 6 is a diagram illustrating a first specific example configuration of an information processing system. In the example illustrated in FIG. 6, a graphics board (including a GPU 321) is mounted on a computing machine 31A installed in a computing machine base 3A, and a DisplayPort signal is output as a video signal. A plurality of terminals may be mounted on the graphics board, and, as illustrated in FIG. 6, two DisplayPort signal lines 351 and 352 may be simultaneously used, for example. Note that a plurality of graphics boards may be mounted on one computing machine, and a plurality of terminals may be used by one user or a plurality of users. The computing machine 31A also exchanges operating information and the like with a USB (USB 2.0 or USB 3.2, for example) terminal via signal lines 353 and 354. Further, a UI transmitting/receiving apparatus 32A of the computing machine base 3A and a UI transmitting/receiving apparatus 43A of a user base 4A are connected to a QSFP28 input/output port (I/O) 311 via a transmission channel TmA, for example.

The functions of the UI transmitting/receiving apparatus 32A are implemented in an application specific integrated circuit (ASIC) or a field programmable gate array (FPGA), for example. FIG. 6 illustrates an example in which an FPGA is used for the UI transmitting/receiving apparatus 32A, and various kinds of signals are accommodated and multiplexed in an OTN.

A signal transmitted from the UI transmitting/receiving apparatus 32A is transmitted through the optical fiber transmission channel TmA, and is sent to the UI transmitting/receiving apparatus 43A of the user base 4A. Note that the transmission channel TmA may be a single-core bidirectional channel or a double-core bidirectional channel. Also, different transmission channels may be used depending on transmission directions. For example, the downlink transmission channel may be a passive optical network (PON), and the uplink transmission channel may be a transmission channel of the 4G communication standard or the 5G communication standard.

The UI transmitting/receiving apparatus 43A performs a process that is the reverse of the process performed on the transmission side, to restore original signals. The restored signals, which are DisplayPort signals 451 and 452, a USB 3.0 signal (413), and a USB 2.0 signal (414) herein, are output from the UI transmitting/receiving apparatus 43A, and are connected to a display apparatus 411, a display apparatus 412, an external apparatus 413, and an input apparatus 414. The external apparatus 413, which is a USB device, and the input apparatus 414, which is a USB device, may be input/output devices such as a keyboard, a mouse, and a gaming controller, a large-capacity storage, an audio interface, a camera, and any of various sensors, for example. Note that the devices connected to the UI transmitting/receiving apparatus 43A are not limited to the above. In the example configuration described later, the devices connected to a UI transmitting/receiving apparatus in a user base are not limited the above either.

Although a flow of signals from the UI transmitting/receiving apparatus 32A of the computing machine base 3A to the UI transmitting/receiving apparatus 43A of the user base 4A has been described, data can be transferred in the reverse direction through signal processing similar to the above.

Next, an example in which the UI transmitting/receiving apparatus 32A is mounted in an FPGA is described, with reference to FIG. 6. Note that, in example implementation g11 and the examples described below, Comp is an abbreviation for compression, MAP is an abbreviation for mapping, MUX is an abbreviation for multiplexing, Encryp is an abbreviation for encryption, and FEC is an abbreviation for forward error correction.

The FPGA has the functions of an OTN as illustrated in the example implementation g11. Video signals may have various conceivable resolutions, refresh rates, and color depths. For example, in the case of a 4K resolution, 120 frames per second (fps), and 24 bits per pixel (bpp) in DisplayPort 1.4, the bit rate is about 26 Gbps. A compression/decompression unit (Comp) 303 (303*a*, 303*b*) compresses this signal as necessary. The compression is performed by VESA DSC, for example. In a case where VESA DSC is used, 3:1 compression is performed, and the bit rate can be reduced to about 8.7 Gbps. In a case where compression is not performed, a low latency is achieved, because the time for a compression process is not required. However, the transfer capacity is larger. In a case where compression is performed, on the other hand, the compression process takes time, and therefore, the latency is higher than that in the non-compression case. However, the transfer capacity can be made smaller.

Note that the bit rate of an image is 4.67 Gbps in the case of 1080 p, 240 Hz, and DSC, 8.61 Gbps in the case of 4K, 120 Hz, 24 bpp, and DSC, and 49.65 Gbps in the case of 8K, 60 Hz, and 24 bpp, for example.

The processing in the non-compression case is now described.

DisplayPort signals are accommodated in ODU frames by mapping functions (MAPs 363 to 366) of the OTN. Note that a mapping/demapping unit 304 has a mapping function. For the mapping, a bit-synchronous mapping procedure (BMP) defined by the OTN, an asynchronous mapping procedure (AMP), or a generic mapping procedure (GMP) can be adopted, for example.

Signals contained in the ODU frames are multiplexed into a higher-level ODU frame by a multiplexing function (MUX 367) of the OTN. When signals of about 26 Gbps are multiplexed in a case where the higher-level ODU is ODU4, the signals can be multiplexed into 20 tributary slots, which are ODTU4.20, because the size of a tributary slot of ODU4 is 1.302 Gbps. In the example implementation g11, for example, the multiplexing link between the MAPs 363 to 365 and the MUX 367 is ODUflex (371 to 373), and the multiplexing link between the MAP 366 and the MUX 367 is ODUO (374). Further, the multiplexing link between the MUX 367 and an Encryp 368, the multiplexing link between the Encryp 368 and a FEC 369, and the multiplexing link between the FEC 377 and a QSFP28 I/O 311 are ODU4 (375, 376, and 377). Note that the Encryp 368 performs an encryption process. The FEC 369 performs error-correcting code processing.

USB signals are now explained.

In the example illustrated in FIG. 6, USB 3.0 signals and USB 2.0 signals are shown. The bit rate of USB 3.0 signals is 5 Gbps, and the bit rate of USB 2.0 signals is 480 Mbps. As in the case of DisplayPort signals, USB signals are first accommodated in ODU frames by the mapping functions of the OTN, and are then multiplexed into the required number of tributary slots in a higher-order ODU frame. In a case where the higher-order ODU is ODU4, the USB 3.0 signals can be multiplexed into four tributary slots, and the USB 2.0 signals can be multiplexed into one tributary slot.

An example of usage state of the tributary slots of ODU4 is illustrated in the surrounded region denoted by reference sign g12 in FIG. 6. As long as there is an empty tributary slot, signals other than those illustrated herein can be multiplexed. After the signals are multiplexed, and are encrypted as necessary, error correction codes (FEC) are assigned to ODU, and the resultant OTU4 signals are output from the UI transmitting/receiving apparatus. In transmitting/receiving the OTU4 signals from the UI transmitting/receiving apparatus 32A, a 100G optical module compliant with the QSFP28 standard, or an electric cable (a direct attachment cable (DAC)) having QSFP28 connectors at both ends can be used, for example.

Example 2

Figure 7:
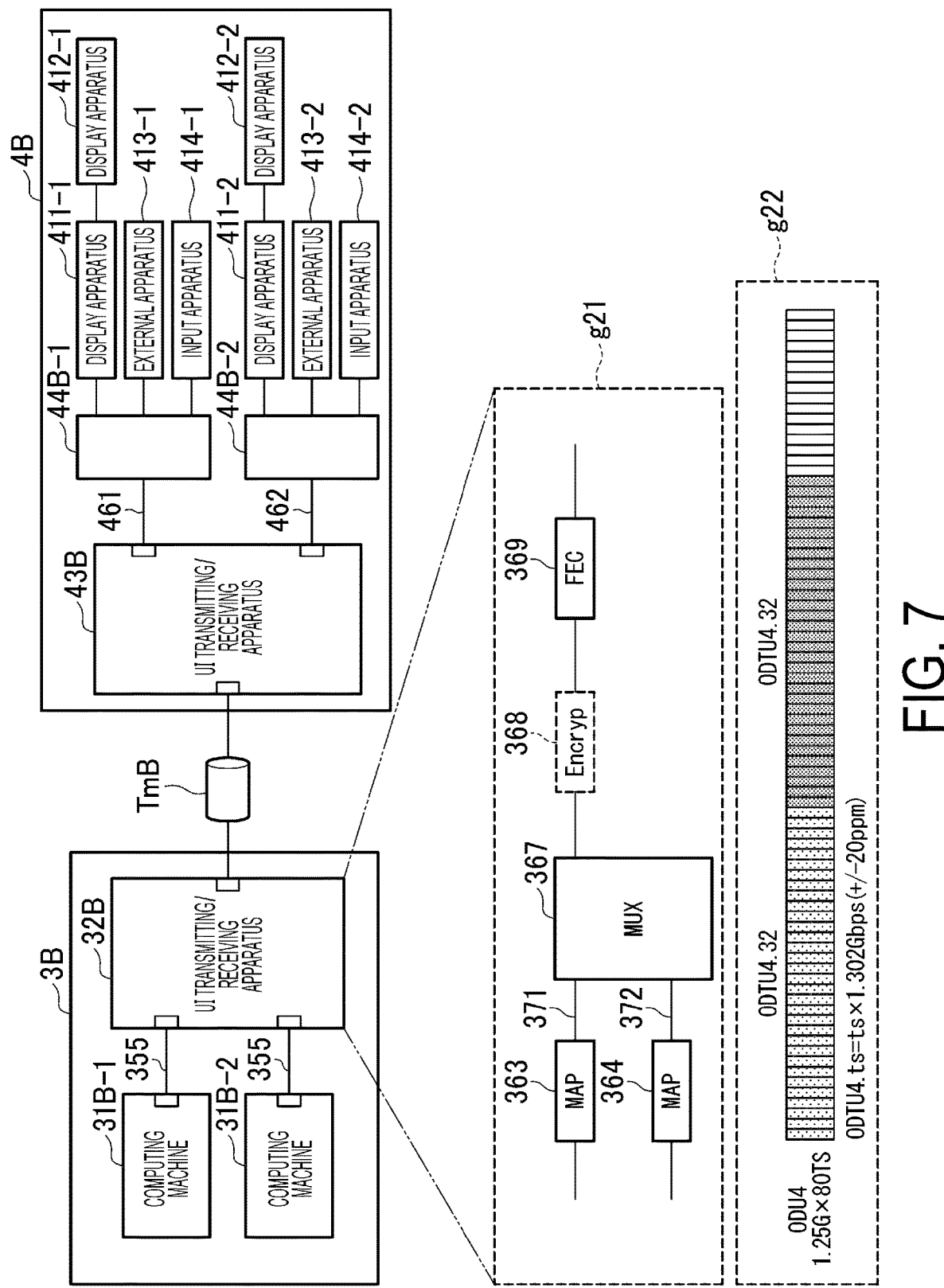
FIG. 7 is a diagram illustrating a second specific example configuration of an information processing system.

FIG. 7 is a diagram illustrating a second specific example configuration of an information processing system. In the example illustrated in FIG. 7, signal lines 355 of computing machines 31B (31B-1, 31B-2) in a computing machine base 3B are signal lines that transmit signals compliant with the Thunderbolt 3 standard. The computing machines 31B and a UI transmitting/receiving apparatus 32B are connected by the signal lines 355. Note that, in Thunderbolt 3, a video signal, a USB signal, and the like are multiplexed, and thus, it is possible to transmit/receive both the video signal and the USB signal simply by transferring Thunderbolt 3. As shown in the surrounded region denoted by reference sign g22 in FIG. 7, Thunderbolt 3 signals are contained in ODU frames as in Example 1, and are then multiplexed into a higher-order ODU frame to be transmitted from the UI transmitting/receiving apparatus 32B to the user base 4B.

Note that, as illustrated in FIG. 7, the UI transmitting/receiving apparatus 32B may be connected to a plurality of computing machines 31B (31B-1, 31B-2), and signals from the computing machines 31B may be multiplexed and transmitted.

A transmission channel TmB between the computing machine base 3B and a user base 4B is OTU4 or OTL4.4, for example.

A UI transmitting/receiving apparatus 43B of the user base 4B is connected to Thunderbolt 3 docks 44B (44B-1, 44B-2). The Thunderbolt 3 docks 44B demultiplex multiplexed signals. One or a plurality of display apparatuses 411 (411-1, 411-2) and 412 (412-1, 412-2), external apparatuses 413 (413-1, 413-2) that are USB 3.0 devices, and input apparatuses 414 (414-1, 414-2) such as a keyboard and a mouse are connected to the Thunderbolt 3 docks 44B.

Example 3

Figure 8:
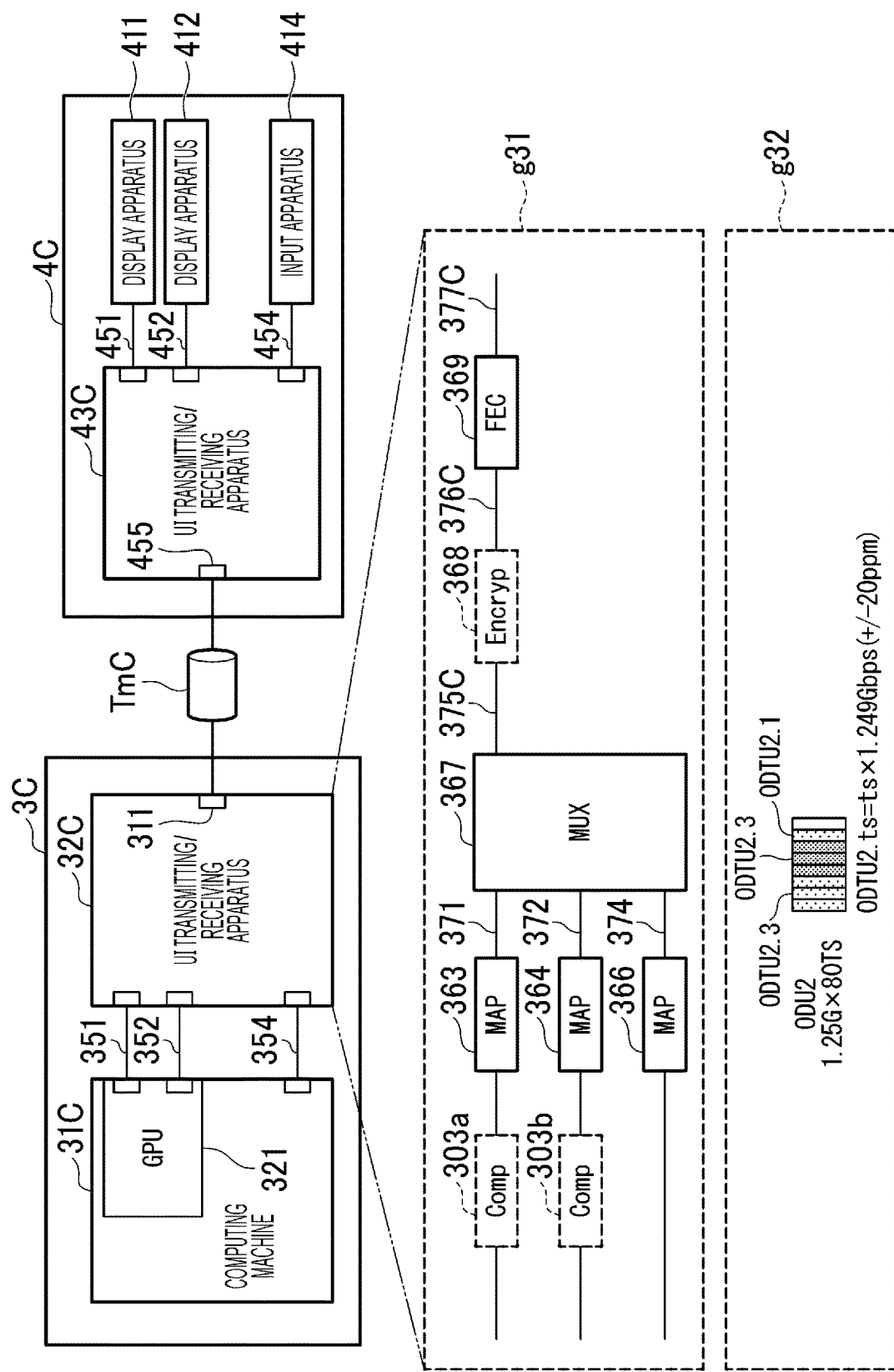
FIG. 8 is a diagram illustrating a third specific example configuration of an information processing system.

FIG. 8 is a diagram illustrating a third specific example configuration of an information processing system. In the example illustrated in FIG. 8, DisplayPort signals of two lines are input/output from a computing machine 31C in a computing machine base 3C via signal lines 351 and 352, and a USB 2.0 signal of one line is input/output via a signal line 354. These signals are input to a UI transmitting/receiving apparatus 32C. In this example case, video signals have 1080 p, 60 fps, and 24 bpp. In this case, the bit rate of the video signals is about 3.2 Gbps. USB 2.0 is 480 Mbps.

These signals are first mapped in ODU frames, as in Examples 1 and 2. The respective ODU signals are multiplexed into a higher-order ODU. Here, an ODU2 signal is used as the higher-order ODU. The capacity of a tributary slot of ODU2 is 1.249 Gbps, and the ODUs in which the respective signals are mapped as illustrated in the surrounded region denoted by reference sign g32 in FIG. 8 are multiplexed into the required number of tributary slots. The ODUs in which DisplayPort is contained are multiplexed into three tributary slots, which are ODTU2.3. The ODUs in which USB2.0 is contained are multiplexed into one tributary slot, which is ODTU2.1.

As illustrated in the surrounded region denoted by reference sign g31 in FIG. 8, the UI transmitting/receiving apparatus 32C encrypts the ODU2 signal as necessary, assigns an error correction code to the ODU2 signal, and then transmits the ODU2 signal as an OTU2 signal from a 10-Gbps optical module 311C called SFP+, for example.

A transmission channel TmC between the computing machine base 3C and a user base 4C is OTU2 (LR), for example. Note that the transmission channel TmC may be a single-core bidirectional channel or a double-core bidirectional channel.

A UI transmitting/receiving apparatus 43C of the user base 4C performs a process that is the reverse of the process performed on the transmission side, to restore original signals. The restored signals, which are DisplayPort signals 451 and 452, and a USB 2.0 signal (454) herein, are output from the UI transmitting/receiving apparatus 43C, and are connected to display apparatuses 411 and 412, and an input apparatus 414 that is a USB 2.0 device, for example.

Example 4

Figure 9:
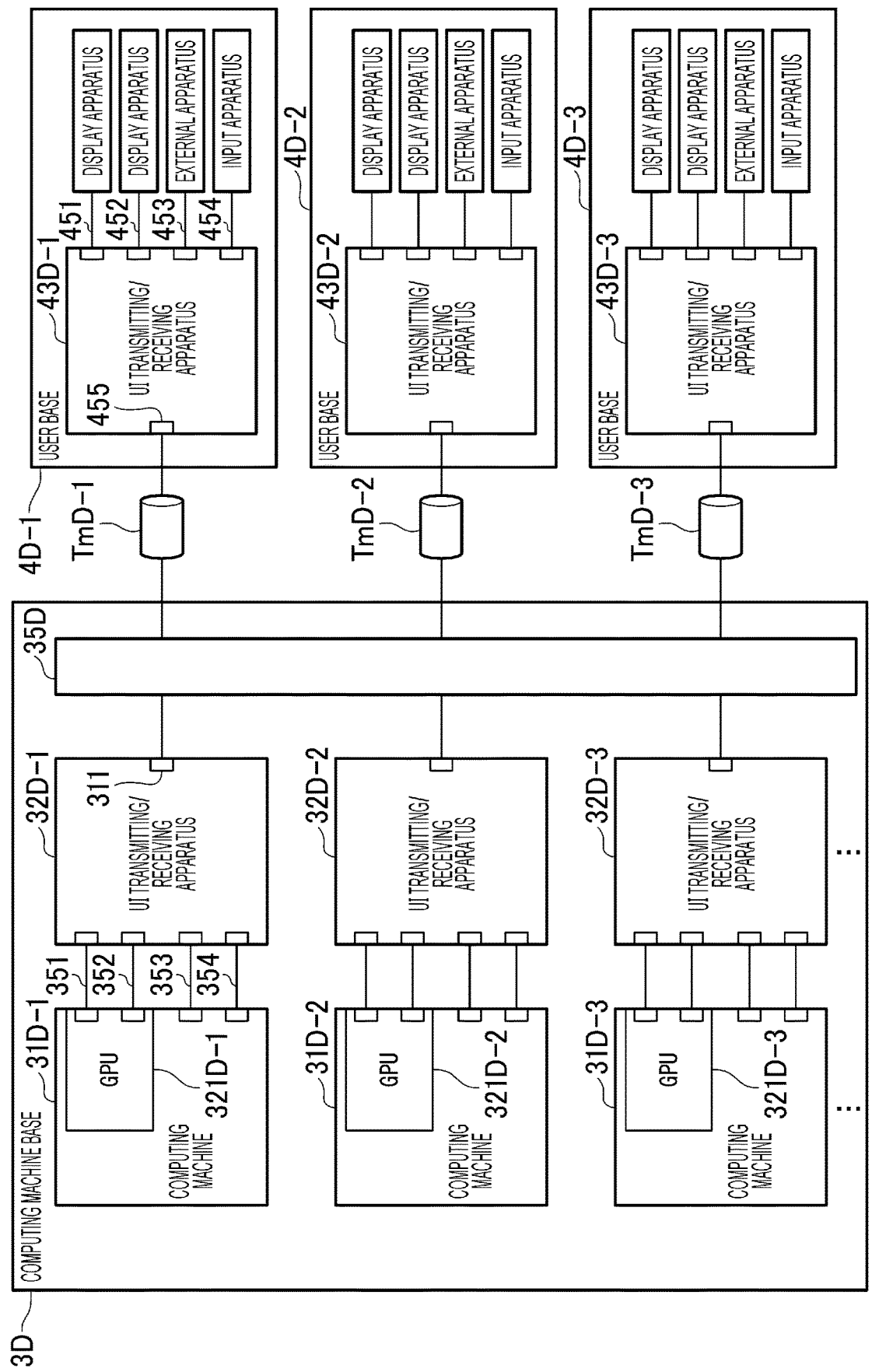
FIG. 9 is a diagram illustrating a fourth specific example configuration of an information processing system.

FIG. 9 is a diagram illustrating a fourth specific example configuration of an information processing system. In the example illustrated in FIG. 9, a plurality of computing machines 31D (31D-1, 31D-2, 31D-3, ...) and a plurality of UI transmitting/receiving apparatuses 32D (32D-1, 32D-2, 32D-3, ...) are installed in a computing machine base 3D.

In this embodiment, the performances of the graphics board GPUs 321D (321D-1, 321D-2, 321D-3) of the three computing machines 31D-1, 31D-2, and 31D-3 are different.

For example, the GPU 321D-1 is a high-performance graphics board, the GPU 321D-2 is a medium-performance graphics board, and the GPU 321D-3 is a low-performance graphics board.

Each computing machine 31D is connected to a UI transmitting/receiving apparatus 32D, as in Examples 1 to 3. An optical switch 35D (a switch) is connected to the outputs of the UI transmitting/receiving apparatuses 32D. The optical switch is a robot patch panel that changes the connection relationship among optical connectors by operating a robot arm, for example. The optical switch is connected to each transmission channel TmD (TmD-1, TmD-2, TmD-3, . . . ), and is connected to UI transmitting/receiving apparatuses 43D (43D-1, 43D-2, 43D-3, . . . ) of user bases 4D (4D-1, 4D-2, 4D-3, . . . ). Note that the transmission channels TmD are OTU4 or OTL4.4 (LR4), for example.

The UI transmitting/receiving apparatuses 43D of the user bases 4D are connected to display apparatuses, external apparatuses that are USB 3.0 devices, and input apparatuses that are USB 2.0 devices, for example, as in Examples 1 to 3.

Here, in a case where a user uses high graphics performance at time 1, the optical switch 35D changes the connection relationship between the UI transmitting/receiving apparatuses 32D and the UI transmitting/receiving apparatuses 43D under the control of the control apparatus 2, so that the computing machine 31D to be used can be selected.

In a case where the same user uses a computing machine for a purpose of use that can be sufficiently achieved with low graphics performance at time 2, the optical switch changes the connection relationship between the UI transmitting/receiving apparatuses 32D and the UI transmitting/receiving apparatuses 43D under the control of the control apparatus 2, so that an appropriate computing machine 31D can be used.

Example 5

Figure 10:
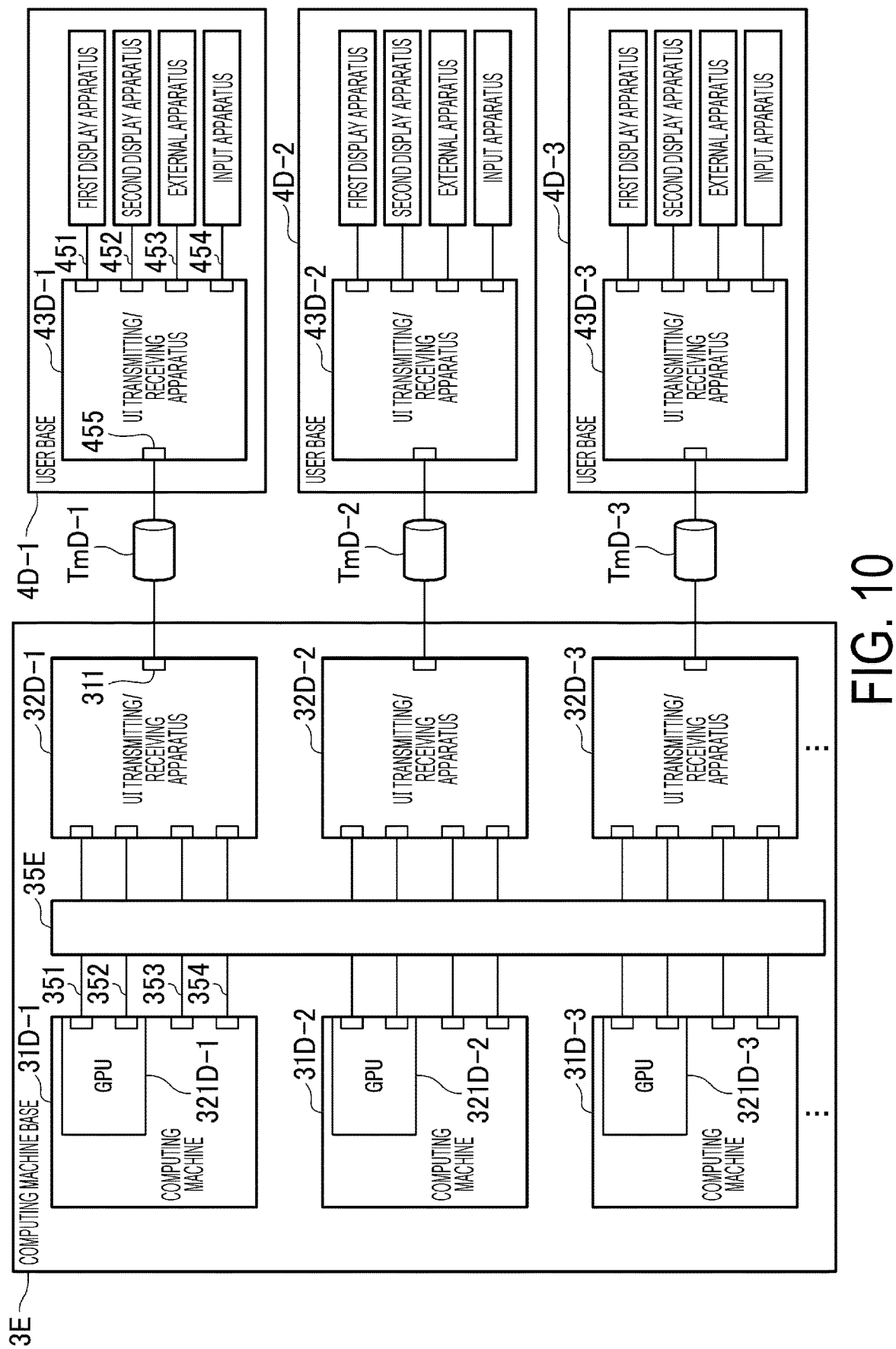
FIG. 10 is a diagram illustrating a fifth specific example configuration of an information processing system.

The mechanism for changing computing machines to be used is not limited to the configuration using the optical switch 35D of Example 4 illustrated in FIG. 9. FIG. 10 is a diagram illustrating a fifth specific example configuration of an information processing system. In the example illustrated in FIG. 10, a switch 35E is provided between computing machines 31D (31D-1, 31D-2, 31D-3, . . . ) and UI transmitting/receiving apparatuses 32D (32D-1, 32D-2, 32D-3, . . . ) of a computing machine base 3E. The switch 35E is a display (DP), a USB switch, or the like, for example, and performs switching under the control of the control apparatus 2.

Example 6

Figure 11:
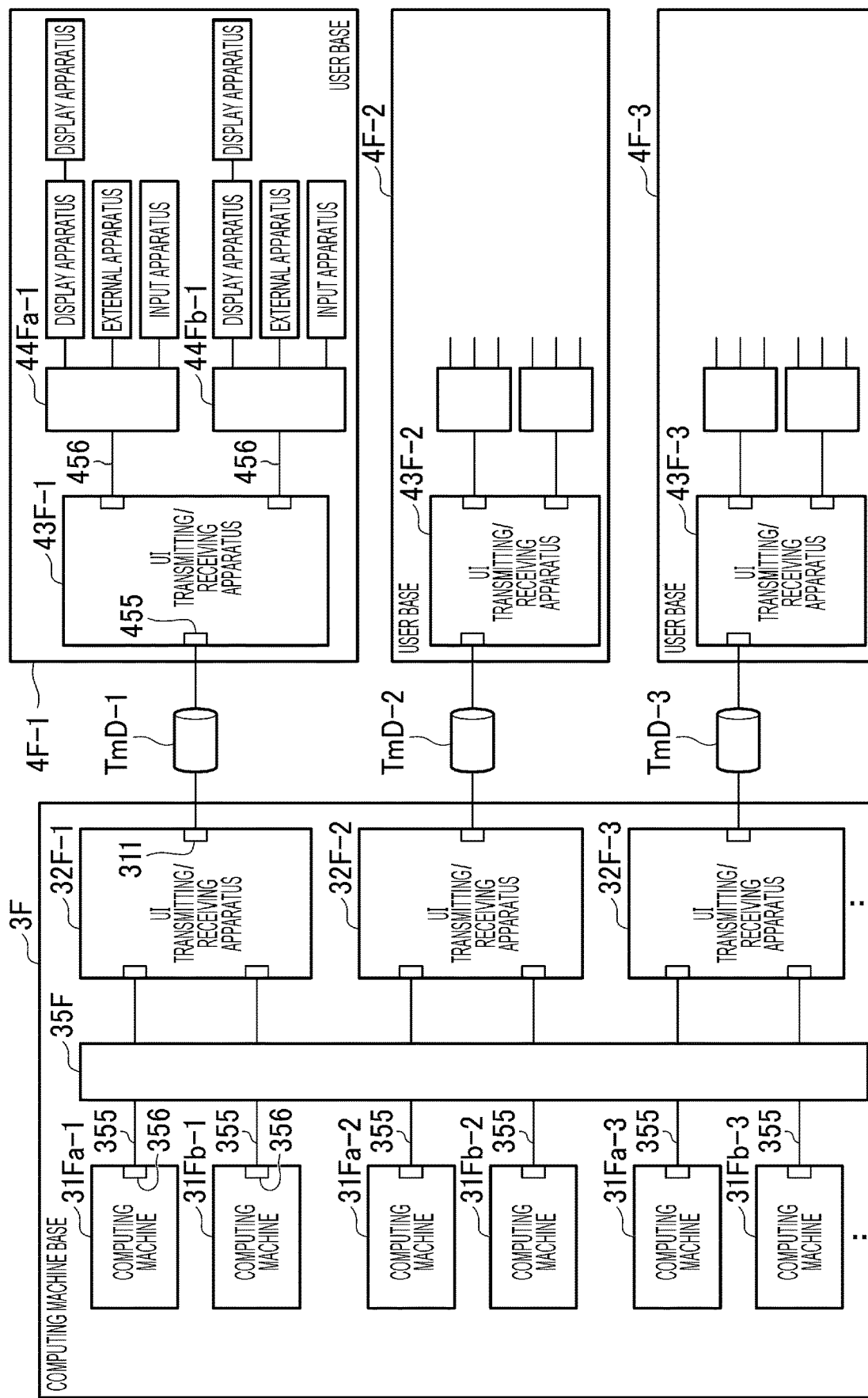
FIG. 11 is a diagram illustrating a sixth specific example configuration of an information processing system.

Alternatively, the optical switch 35D of Example 4 illustrated in FIG. 9 may be a Thunderbolt 3 switch 35F (a switch) as illustrated in FIG. 11. FIG. 11 is a diagram illustrating a sixth specific example configuration of an information processing system. In the example illustrated in FIG. 11, the Thunderbolt 3 switch 35F is provided between computing machines 31F (31Fa-1, 31Fb-1, 31Fa-2, 31Fb-2, 31Fa-3, 31Fb-3, . . . ) and UI transmitting/receiving apparatuses 32F (32F-1, 32F-2, 32F-3, . . . ) of a computing machine base 3F.

In this case, the output ports 356 of the computing machines 31F are USB Type-C, for example, and the computing machines 31F and the Thunderbolt 3 switch 35F are connected by signal lines 355 compliant with the Thunderbolt 3 standard or the like.

Note that the computing machines 31F-1 (31Fa-1, 31Fb-1) are high-performance graphics boards, the computing machines 31F-2 (31Fa 2, 31Fb-2) are medium-performance graphics boards, and the computing machines 31F-3 (31Fa-3, 31Fb-3) are low-performance graphics boards, for example.

Meanwhile, in user bases 4F (4F-1, 4F-2, 4F-3, . . . ), the respective ports of UI transmitting/receiving apparatuses 43F (43F-1, 43F-2, 43F-3, . . . ) are connected to Thunderbolt 3 docks 44F (44Fa-1, 44Fb-1, 44Fa-2, 44Fb-2, 44Fa-3, 44Fb-3, . . . ) via signal lines 456. Note that switching control on the Thunderbolt 3 docks 44F is performed by the control apparatus 2.

Further, the configurations of the user bases 4F-1, 4F-2, and 4F-3 may be the same or may be different.

Example 7

Figure 12:
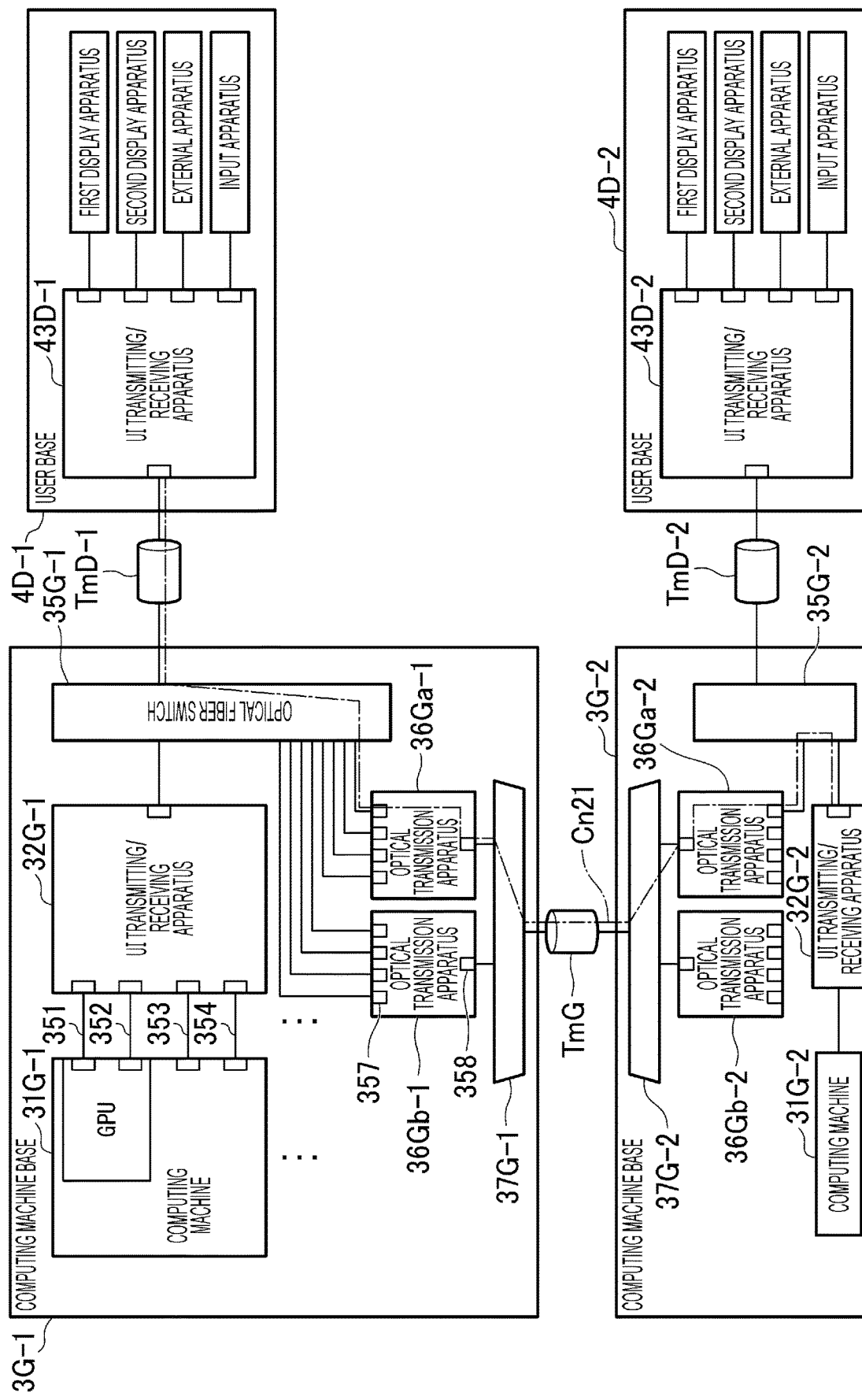
FIG. 12 is a diagram illustrating a seventh specific example configuration of an information processing system in which computing machine bases are connected to each other.

FIG. 12 is a diagram illustrating a seventh specific example configuration of an information processing system in which computing machine bases are connected to each other.

The explanation to be made herein with reference to FIG. 12 concerns a case where, when a user of a user base 4D-1 tries to use a computing machine 31G of desired performance, all the computing machines 31G of the performance requested by the user are being used by other users and are not available in the computing machine base 3G-1 directly connected from the user base 4D-1 via a transmission channel, or a case where such computing machines 31G are not installed.

In this example case, a computing machine 31G of the performance desired by the user is installed in a computing machine base 3G-2 and is available.

At that stage, a signal from a UI transmitting/receiving apparatus 43D-1 of the user base 4D-1 is connected to an optical switch 35G-1 of the computing machine base 3G-1 directly connected via a transmission channel TmD-1 as indicated by a dot-and-dash line in a channel Cn21, under the control of the control apparatus 2. In the computing machine base 3G-1, the signal is then sent to an optical transmission apparatus 36Ga-1 for communicating with the computing machine base 3G-2 in which the computing machine 31G of the performance desired by the user is installed. In the computing machine base 3G-1, after passing through the optical transmission apparatus 36Ga-1, the signal is subjected to optical multiplexing by an optical multiplexer 37G-1 as necessary, and then reaches the computing machine base 3G-2.

In the computing machine base 3G-2, the signal is demultiplexed by an optical multiplexer 37G-2, and the demultiplexed signal is input to an optical transmission apparatus 36Ga-2, and is connected to a UI transmitting/receiving apparatus 32G-2 via an optical fiber switch 35G-2.

The ports of the optical transmission apparatuses 36G (36Ga-1, 36Gb-1, 36Ga-2, 36Gb-2) connected to the optical switches 35G (35G-1, 35G-2) (switches) are ports compliant with the QSFP28 standard, for example. Also, the ports of the optical transmission apparatuses 36G (36Ga-1, 36Gb-1, 36Ga-2, 36Gb-2) connected to the optical multiplexers 37G (37G-1, 37G-2) are ports compliant with the QSFP56-DD standard, for example.

Meanwhile, the optical switches 35G (35G-1, 35G-2) are optical fiber switches, robot patch panels, or the like, for example. Further, the computing machine bases 3G are connected by a transmission channel TmG. The transmission channel TmG is an optical fiber cable that transmits a signal compliant with the 400G-ZR (DWDM) or OTU4 standard, for example.

Note that, although FIG. 12 illustrates only a unidirectional flow of a signal, a flow in the reverse direction is similar to the above. With the above configuration, it is possible to connect to a UI transmitting/receiving apparatus 32G of another computing machine base 3G, and share the resources of a computing machine 31G of desired performance.

Example 8

Figure 13:
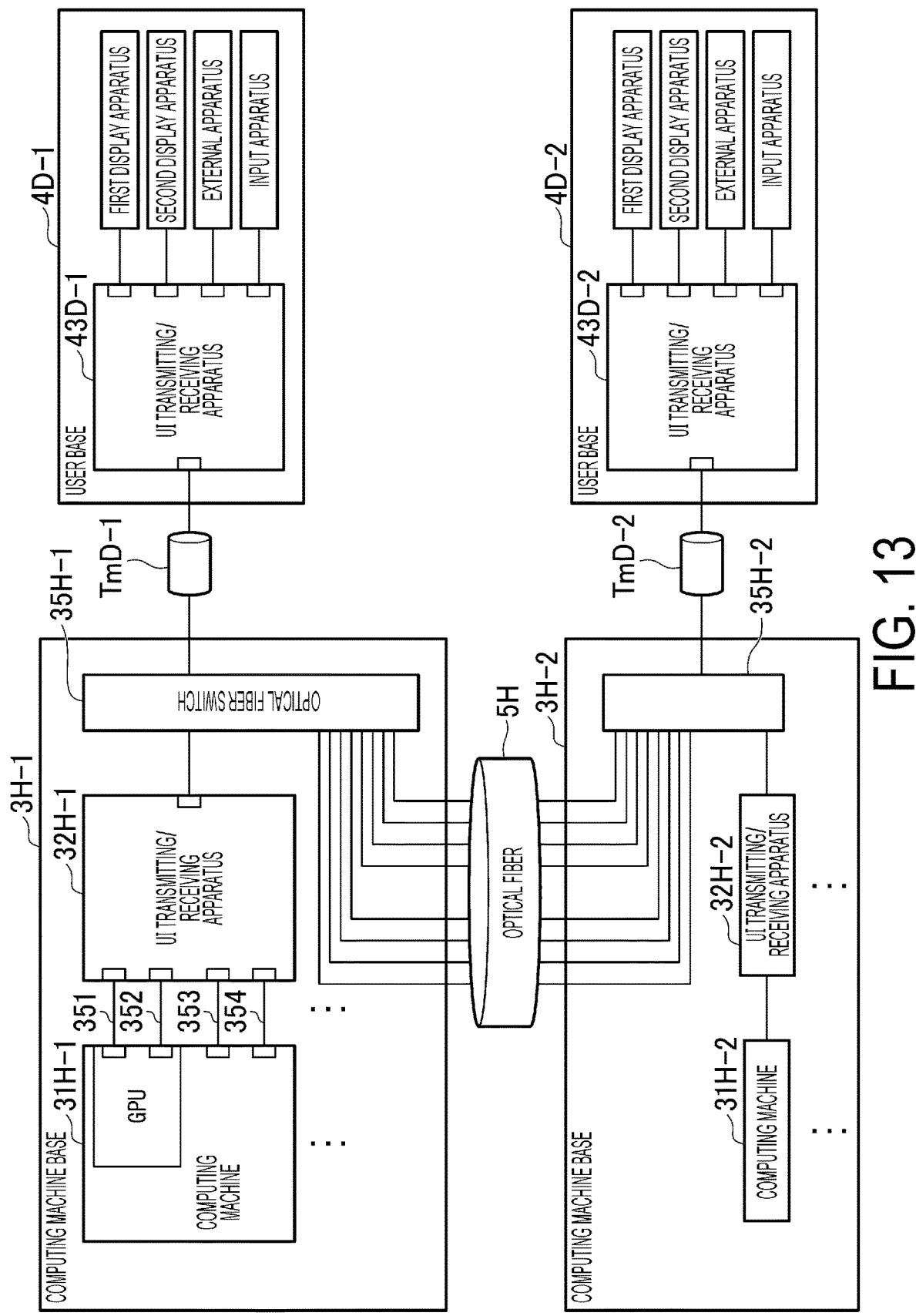
FIG. 13 is a diagram illustrating an eighth specific example configuration of an information processing system, and another example of connection between adjacent computing machine bases.

FIG. 13 is a diagram illustrating an eighth specific example configuration of an information processing system, and another example of connection between adjacent computing machine bases.

In this example, computing machine bases 3H (3H-1, 3H-2) are connected by a transmission medium 5H such as a multicore optical fiber or a multicore fiber, for example. With the transmission medium 5H, a UI transmitting/receiving apparatus 43D-1 of a user base 4D-1 and a UI transmitting/receiving apparatus 32H-2 of a computing machine base 3H-2 can be connected, for example. Note that the transmission medium 5H may be a multidirectional channel.

Example 9

Figure 14:
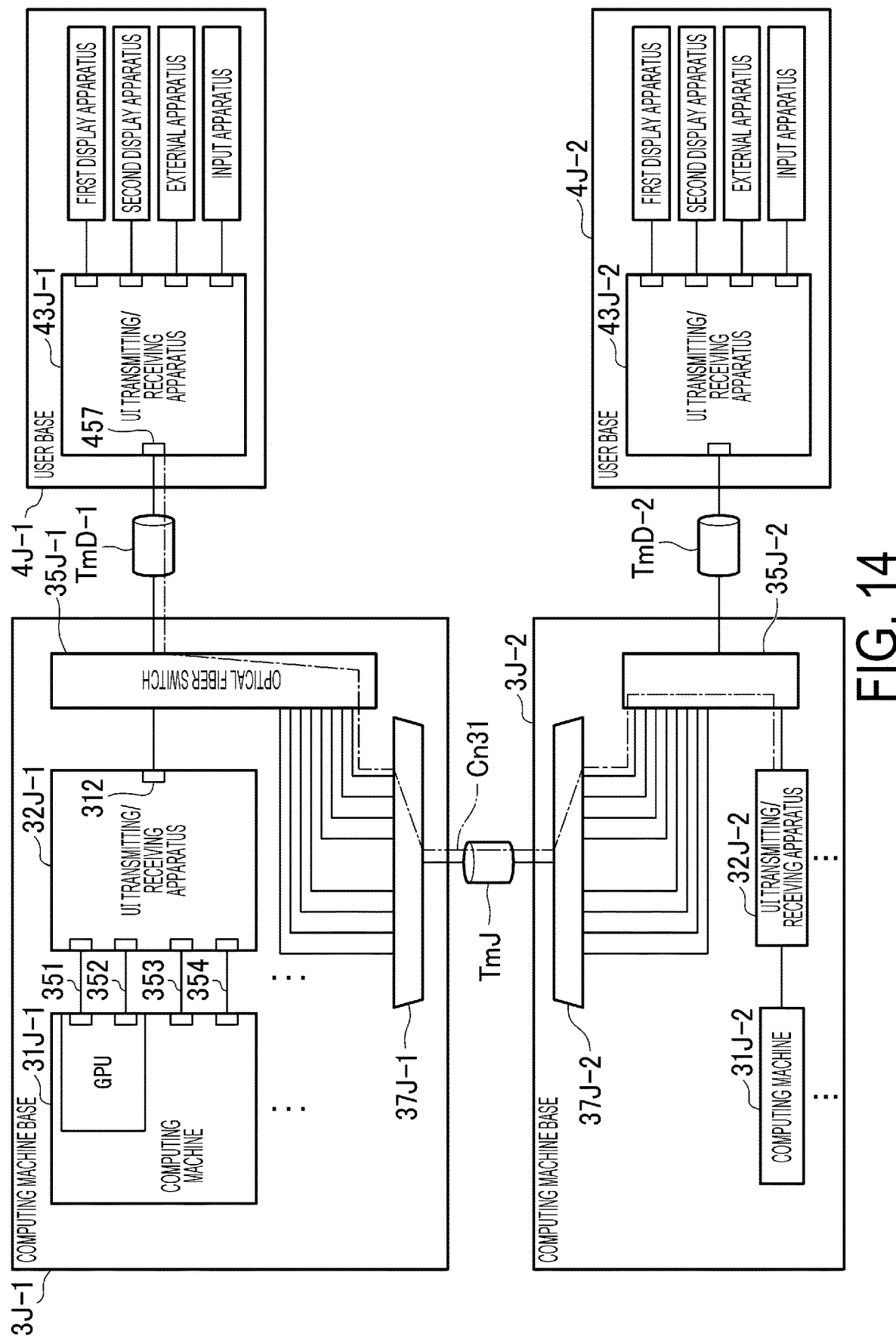
FIG. 14 is a diagram illustrating a ninth specific example configuration of an information processing system, and another example of connection between adjacent computing machine bases.
Figure 15:
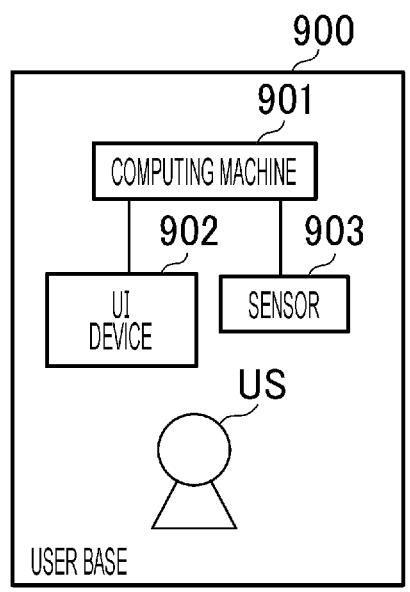
FIG. 15 is a diagram illustrating an example configuration in which a computing machine and a UI device according to a conventional technology are connected directly to each other.
Figure 16:
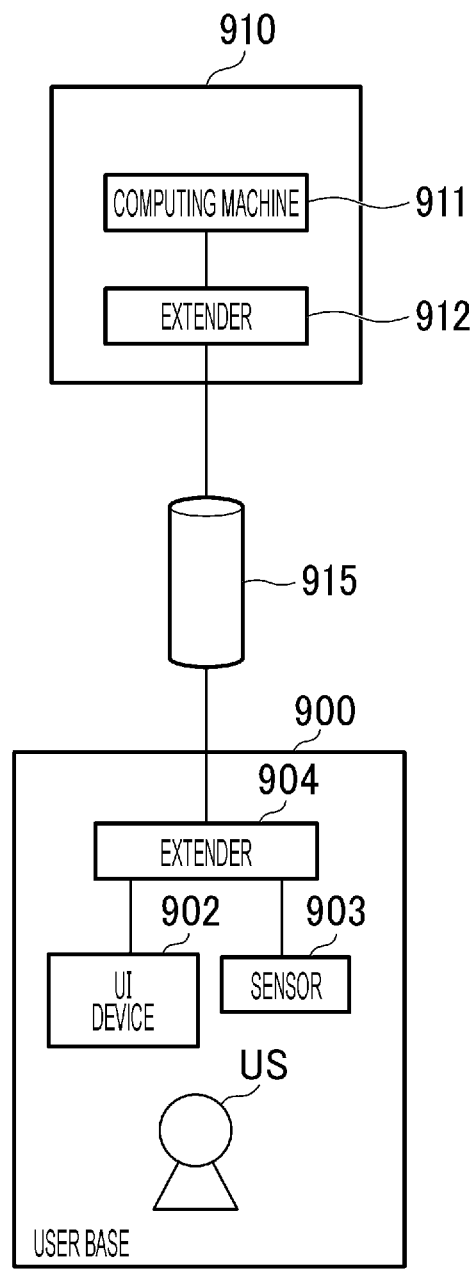
FIG. 16 is a diagram illustrating an example of connection between a UI device and a computing machine using extenders according to a conventional technology.
Figure 17:
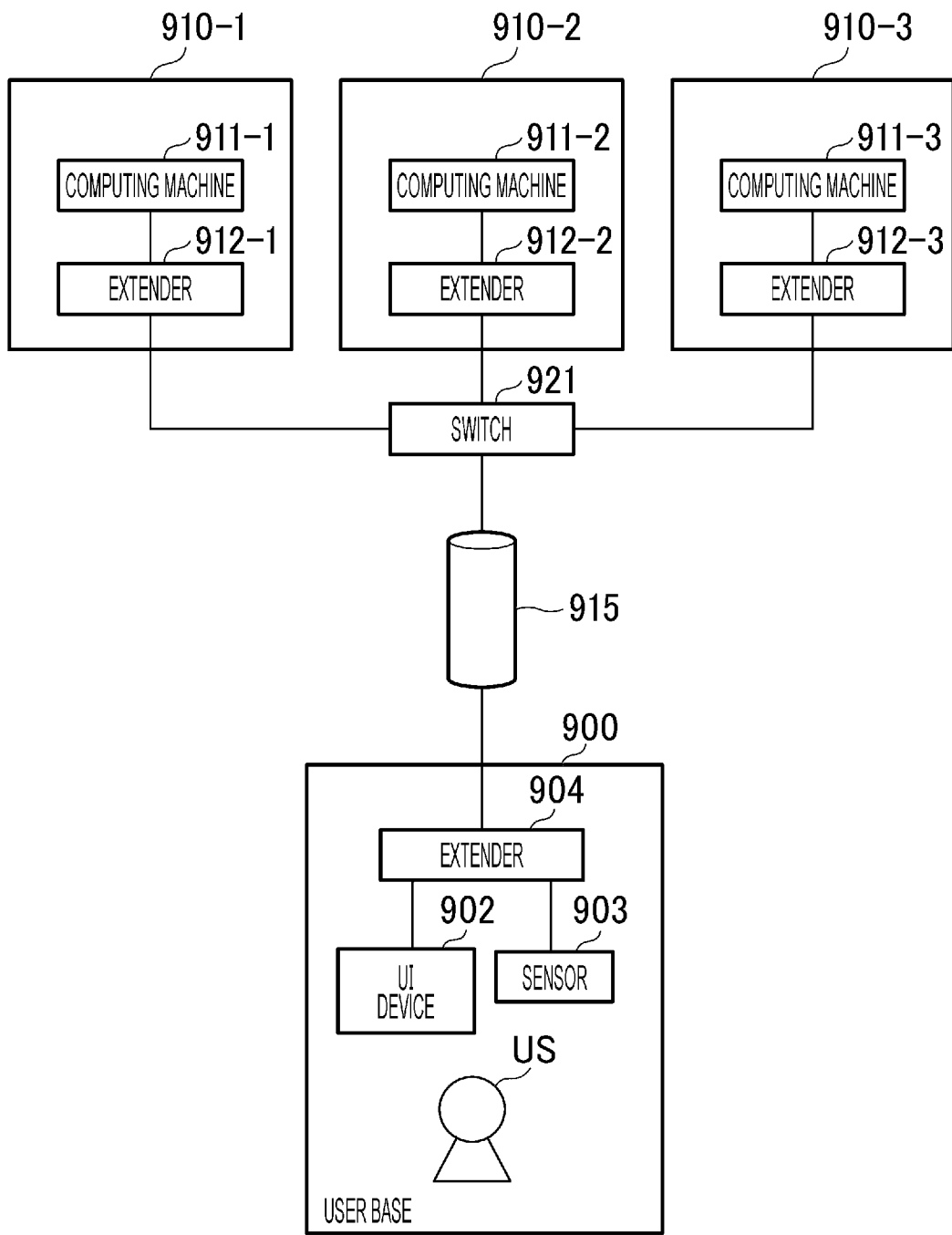
FIG. 17 is a diagram illustrating another example of connection between a UI device and computing machines using extenders according to a conventional technology.
Figure 18:
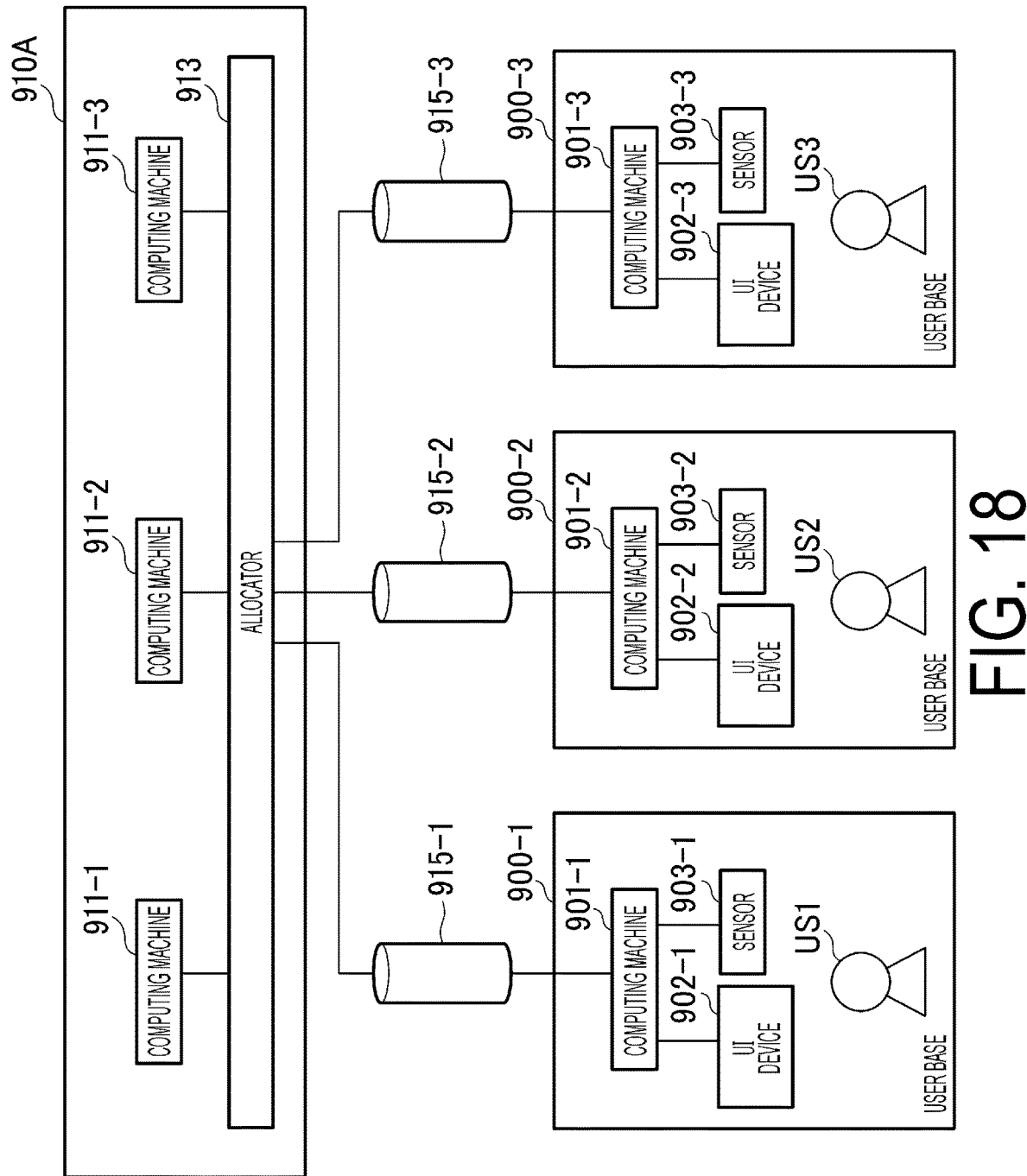
FIG. 18 is a diagram illustrating an example configuration of a remote desktop according to a conventional technology.

FIG. 14 is a diagram illustrating a ninth specific example configuration of an information processing system, and another example of connection between adjacent computing machine bases.

In this example, UI transmitting/receiving apparatuses 43J (43J-1, 43J-2) of user bases 4J (4J-1, 4J-2) includes WDM interfaces.

As in a channel Cn31, signals from the UI transmitting/receiving apparatuses 43J reach an optical switch 35J-1 of the computing machine base 3J-1 to which the user base 4J-1 is directly connected via transmission channels TmD (TmD-1, TmD-2). Note that the optical switches 35J (35-J, 35J-2) may be optical switches, robot patch switches, or the like. As the optical switch 35J-1 performs switching, data is input to an optical multiplexer 37J-1 or a reconfigurable optical add drop multiplexer (ROADM) for transmission to an adjacent computing machine base 3J-2, and is transmitted to the adjacent computing machine base 3J-2. The transmitted signal is demultiplexed by an optical multiplexer 37J-2 or a ROADM, and is connected to a desired UI transmitting/receiving apparatus 32J-2 via the optical fiber switch 35J-2.

Note that UI transmitting/receiving apparatuses 32J (32J-1, 32J-2) of computing machine bases 3J (3J-1, 3J-2) are connected to the optical switches 35J via CFP2 ports 312, for example. Also, the UI transmitting/receiving apparatuses 43J of the user bases 4J are connected to the transmission channels TmD (TmD-1, TmD-2) via CFP2 ports 457, for example.

Further, a transmission channel TmJ is an optical fiber cable or the like that transmits signals compliant with the OTU4 (WDM) standard, for example.

Note that each example described above is merely an example, and implementation configurations are not limited to these examples. For example, other apparatuses and the like may be connected to the computing machine bases 3 and the user bases 4.

Although embodiments of the present invention have been described in detail with reference to the drawings so far, specific configurations are not limited to these embodiments, and include designs and the like without departing from the spirit of the present invention.

INDUSTRIAL APPLICABILITY

The present invention can be applied to a gaming system, an eSports system, a remote desktop system, a computing machine rental system, and the like, for example.

REFERENCE SIGNS LIST 1 information processing system
2 control apparatus
3 computing machine base
4 user base
5 location detector
31 computing machine
32 UI transmitting/receiving apparatus
33 allocator
34 switcher
35, 35E, 35F, 35G, 35H, 35J switch
36 optical transmission apparatus
37 optical multiplexer
41 UI device
42 sensor
43 UI transmitting/receiving apparatus
44 Thunderbolt 3 dock
301 monitoring control unit
302 UI input/output unit
303 compression/decompression unit
304 mapping/demapping unit
305 multiplexing/demultiplexing unit
306 transmission/reception unit
307 sensor input/output unit
321 GPU
401 monitoring control unit
402 UI input/output unit
403 compression/decompression unit
404 mapping/demapping unit
405 multiplexing/demultiplexing unit
406 transmission/reception unit
407 sensor input/output unit
NW1 first network
NW2 second network
Tm transmission channel

The invention claimed is:

1. An information processing system comprising:
a computing machine installed in a computing machine base, and a first transmitting/receiving apparatus connected to the computing machine;
a second transmitting/receiving apparatus installed in a user base that is used by a user, and a device connected to the second transmitting/receiving apparatus; and
a control apparatus configured to control connection between one first transmitting/receiving apparatus among a plurality of the first transmitting/receiving apparatuses and the second transmitting/receiving apparatus,
wherein the control apparatus is configured to change a first connection between the second transmitting/receiving apparatus and the first transmitting/receiving apparatus to a second connection between the second transmitting/receiving apparatus and another one of the first transmitting/receiving apparatuses, and copy computing machine state information about a pre-change computing machine that is the computing machine before the change, into a post-change computing machine that is the computing machine after the change, before the user starts using the post-change computing machine, on a basis of a movement prediction or a change prediction about the user, the computing machine state information being copied from the pre-change computing machine, and the control apparatus is configured to make the change prediction about the user, on a basis of an operating rate of the pre-change computing machine.

2. The information processing system according to claim 1, further comprising:

a first network configured to perform data communication among a plurality of the computing machines; and a second network configured to perform communication between the first transmitting/receiving apparatus and the second transmitting/receiving apparatus, wherein the control apparatus is configured to change, via the second network, a first connection between the second transmitting/receiving apparatus and the first transmitting/receiving apparatus to a second connection between the second transmitting/receiving apparatus and another one of the first transmitting/receiving apparatuses, and copy the computing machine state information from the pre-change computing machine into the post-change computing machine via the first network.

3. The information processing system according to claim 1, wherein the computing machine state information is information regarding a state of the computing machine used by the user before the change, and is at least one piece of CPU state information, GPU state information, memory state information, and storage state information, or an appropriate combination of CPU state information, GPU state information, memory state information, and storage state information, and the control apparatus is configured to copy the computing machine state information from the pre-change computing machine into the post-change computing machine.

4. The information processing system according to claim 1, wherein the control apparatus is configured to make a movement prediction about the user, on a basis of location information detected by a location detector being carried by the user.

5. An information processing method implemented in an information processing system that includes: a computing machine installed in a computing machine base, and a first transmitting/receiving apparatus connected to the computing machine; a second transmitting/receiving apparatus installed in a user base that is used by a user, and a device connected to the second transmitting/receiving apparatus; and a control apparatus configured to control connection between one first transmitting/receiving apparatus among a plurality of the first transmitting/receiving apparatuses and the second transmitting/receiving apparatus, the information processing method comprising by the control apparatus, changing a first connection between the second transmitting/receiving apparatus and the first transmitting/receiving apparatus to a second connection between the second transmitting/receiving apparatus and another one of the first transmitting/receiving apparatuses, and copying computing machine state information about a pre-change computing machine that is the computing machine before the change, into a post-change computing machine that is the computing machine after the change, before the user starts using the post-change computing machine, on a basis of a movement prediction or a change prediction about the user, the computing machine state information being copied from the pre-change computing machine, wherein the information processing method further comprises, by the control apparatus, making the change prediction about the user, on a basis of an operating rate of the pre-change computing machine.

6. A non-transitory computer readable storage medium storing a program that is executed in an information processing system that includes: a computing machine installed in a computing machine base, and a first transmitting/receiving apparatus connected to the computing machine; a second transmitting/receiving apparatus installed in a user base that is used by a user, and a device connected to the second transmitting/receiving apparatus; and a control apparatus configured to control connection between one first transmitting/receiving apparatus among a plurality of the first transmitting/receiving apparatuses and the second transmitting/receiving apparatus, the program causing a computer of the control apparatus to:

change a first connection between the second transmitting/receiving apparatus and the first transmitting/receiving apparatus to a second connection between the second transmitting/receiving apparatus and another one of the first transmitting/receiving apparatuses; and copy computing machine state information about a pre-change computing machine that is the computing machine before the change, into a post-change computing machine that is the computing machine after the change, before the user starts using the post-change computing machine, on a basis of a movement prediction or a change prediction about the user, the computing machine state information being copied from the pre-change computing machine, wherein the program further causes the computer of the control apparatus to make the change prediction about the user, on a basis of an operating rate of the pre-change computing machine.

* * * * *